(12) United States Patent
Davis et al.

(10) Patent No.: US 7,295,852 B1
(45) Date of Patent: Nov. 13, 2007

(54) AUTOMATED TELEPHONE CONFERENCING METHOD AND SYSTEM

(75) Inventors: Mark Davis, Mill Valley, CA (US); Edwin Booth, San Francisco, CA (US); Chad Jennings, San Mateo, CA (US)

(73) Assignee: Palm, Inc., Sunnyvale, CA (US)

( * ) Notice: Subject to any disclaimer, the term of this patent is extended or adjusted under 35 U.S.C. 154(b) by 798 days.

(21) Appl. No.: 10/602,466

(22) Filed: Jun. 23, 2003

Related U.S. Application Data

(60) Provisional application No. 60/467,794, filed on May 1, 2003.

(51) Int. Cl.
*H04B 7/00* (2006.01)
(52) U.S. Cl. ............. 455/518; 379/202.01; 379/207.02
(58) Field of Classification Search ................ 455/518, 455/412.1, 550.1; 379/202.01
See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,887,212 A | 12/1989 | Zamora et al. | |
| 4,892,981 A | 1/1990 | Soloway et al. | |
| 4,916,441 A | 4/1990 | Gombrich | |
| 5,010,547 A | 4/1991 | Johnson et al. | |
| 5,012,219 A | 4/1991 | Henry | |
| D320,598 S | 10/1991 | Auerbach et al. | |
| 5,067,164 A | 11/1991 | Denker et al. | |
| 5,075,684 A | 12/1991 | DeLuca | |
| 5,101,439 A | 3/1992 | Kiang | |
| 5,218,188 A | 6/1993 | Hanson | |
| 5,227,614 A | 7/1993 | Danielson et al. | |
| 5,307,086 A | 4/1994 | Griffin et al. | |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |
| 5,357,065 A | 10/1994 | Mitamura et al. | |

(Continued)

FOREIGN PATENT DOCUMENTS

EP              0149762 A1      7/1986

(Continued)

OTHER PUBLICATIONS

"MICROSOFT", Microsoft Windows & MS-DOS User's Guide, (1993), p. 19,26.

(Continued)

*Primary Examiner*—Creighton Smith
(74) *Attorney, Agent, or Firm*—Kacvinsky LLC

(57) ABSTRACT

A computer implemented method of conducting a teleconference is disclosed. The method includes selecting a group of potential conferees using a graphical user interface tool displayed on a display screen, automatically setting up the teleconference by accessing telephone numbers for each conferee of the group of potential conferees and individually attempting to make contact with the group of potential conferees over a telephone system. The method further includes updating contact status information for the group of potential conferees during the automatic set up of the teleconference. A teleconference is established between the available conferees of the group of potential conferees.

49 Claims, 36 Drawing Sheets

U.S. PATENT DOCUMENTS

| | | | |
|---|---|---|---|
| 5,359,317 A | 10/1994 | Gomez et al. | |
| 5,379,057 A | 1/1995 | Clough et al. | |
| 5,392,447 A | 2/1995 | Schlack et al. | |
| 5,394,140 A | 2/1995 | Wong et al. | |
| D359,920 S | 7/1995 | Sakamoto | |
| 5,465,401 A | 11/1995 | Thompson | |
| 5,494,363 A | 2/1996 | Hochgesang | |
| 5,503,484 A | 4/1996 | Louis | |
| 5,510,808 A | 4/1996 | Cina, Jr. | |
| 5,584,054 A | 12/1996 | Tyneski et al. | |
| 5,612,682 A | 3/1997 | DeLuca et al. | |
| 5,619,555 A | 4/1997 | Fenton et al. | |
| 5,627,978 A | 5/1997 | Altom et al. | |
| 5,650,776 A | 7/1997 | Mitchell et al. | |
| 5,705,995 A | 1/1998 | Laflin et al. | |
| 5,742,894 A | 4/1998 | Jambhekar et al. | |
| 5,745,904 A | 4/1998 | King et al. | |
| 5,754,636 A | 5/1998 | Bayless et al. | |
| 5,779,030 A | 7/1998 | Ikegami et al. | |
| 5,797,089 A | 8/1998 | Nguyen | |
| 5,797,098 A | 8/1998 | Schroeder et al. | |
| 5,809,115 A | 9/1998 | Inkinen | |
| 5,812,651 A | 9/1998 | Kaplan | |
| 5,813,778 A | 9/1998 | Shih | |
| 5,815,142 A | 9/1998 | Ailard et al. | |
| 5,848,356 A | 12/1998 | Jambhekar et al. | |
| 5,860,074 A | 1/1999 | Rowe et al. | |
| 5,873,108 A | 2/1999 | Goyal et al. | |
| 5,903,852 A | 5/1999 | Schaupp, Jr. et al. | |
| 5,917,905 A | 6/1999 | Whipple et al. | |
| 5,917,906 A | 6/1999 | Thornton | |
| 5,922,071 A | 7/1999 | Taylor et al. | |
| 5,941,648 A | 8/1999 | Robinson et al. | |
| 5,949,764 A | 9/1999 | Yoshida et al. | |
| 5,958,006 A | 9/1999 | Eggleston et al. | |
| 5,974,334 A | 10/1999 | Jones, Jr. | |
| D416,256 S | 11/1999 | Griffin et al. | |
| 6,002,944 A | 12/1999 | Beyda | |
| 6,006,109 A | 12/1999 | Shin | |
| 6,016,142 A | 1/2000 | Chang et al. | |
| 6,018,571 A | 1/2000 | Langlois et al. | |
| 6,029,072 A | 2/2000 | Barber | |
| 6,035,214 A | 3/2000 | Henderson | |
| 6,055,439 A | 4/2000 | Helin et al. | |
| 6,058,304 A | 5/2000 | Callaghan et al. | |
| 6,084,951 A | 7/2000 | Smith et al. | |
| 6,097,391 A | 8/2000 | Wilcox | |
| 6,101,531 A | 8/2000 | Eggleston et al. | |
| 6,119,179 A | 9/2000 | Whitridge et al. | |
| 6,133,916 A | 10/2000 | Bukszaar et al. | |
| 6,157,630 A | 12/2000 | Adler et al. | |
| 6,166,342 A | 12/2000 | Chou | |
| 6,169,911 B1 | 1/2001 | Wagner et al. | |
| 6,188,917 B1 | 2/2001 | Laureanti | |
| 6,198,053 B1 | 3/2001 | Chou | |
| 6,243,452 B1 | 6/2001 | O'Shaughnessey et al. | |
| 6,256,631 B1 | 7/2001 | Malcolm | |
| 6,259,449 B1 | 7/2001 | Saxena et al. | |
| 6,295,372 B1 | 9/2001 | Hawkins et al. | |
| 6,297,795 B1 | 10/2001 | Kato et al. | |
| 6,310,609 B1 | 10/2001 | Morgenthaler | |
| 6,317,781 B1 | 11/2001 | De Boor et al. | |
| 6,333,973 B1 | 12/2001 | Smith et al. | |
| D454,349 S | 3/2002 | Makidera et al. | |
| 6,370,018 B1 | 4/2002 | Miller, Jr. et al. | |
| D456,794 S | 5/2002 | Laverick et al. | |
| 6,389,124 B1 | 5/2002 | Schnarel et al. | |
| 6,405,172 B1 | 6/2002 | Baker et al. | |
| 6,415,138 B2 | 7/2002 | Sirola et al. | |
| D462,354 S | 9/2002 | Kimbre et al. | |
| 6,452,588 B2 | 9/2002 | Griffin et al. | |
| D464,962 S | 10/2002 | MacGregor et al. | |
| 6,469,910 B2 | 10/2002 | Lefort | |
| 6,502,090 B1 | 12/2002 | Raisanen | |
| D468,714 S | 1/2003 | Maruska et al. | |
| D470,842 S | 2/2003 | Bhatia et al. | |
| 6,516,202 B1 | 2/2003 | Hawkins et al. | |
| D471,559 S | 3/2003 | De Saulles | |
| 6,557,004 B1 | 4/2003 | Ben-Shachar et al. | |
| D477,597 S | 7/2003 | Laverick et al. | |
| 6,636,203 B1 | 10/2003 | Wong et al. | |
| 6,661,404 B1 | 12/2003 | Sirola et al. | |
| D488,478 S | 4/2004 | Laverick et al. | |
| 6,781,575 B1 | 8/2004 | Hawkins et al. | |
| 6,792,090 B1 | 9/2004 | Kobayashi | |
| 6,947,158 B1 | 9/2005 | Kitamura et al. | |
| 6,973,217 B2 | 12/2005 | Boliek et al. | |
| 6,976,217 B1 | 12/2005 | Vertaschitsch | |
| 7,007,239 B1 | 2/2006 | Hawkins et al. | |
| 7,058,168 B1 * | 6/2006 | Knappe et al. | 379/204.01 |
| 7,155,419 B2 | 12/2006 | Blackman et al. | |
| 2002/0115478 A1 | 8/2002 | Fujisawa et al. | |
| 2002/0133378 A1 | 9/2002 | Mault et al. | |
| 2002/0154745 A1 | 10/2002 | Shtivelman | |
| 2003/0064751 A1 | 4/2003 | Charlier et al. | |
| 2003/0122779 A1 | 7/2003 | Martin et al. | |
| 2003/0228863 A1 | 12/2003 | Vander Veen et al. | |
| 2003/0228888 A1 | 12/2003 | Adamson | |
| 2004/0008827 A1 | 1/2004 | Martin et al. | |
| 2004/0023643 A1 | 2/2004 | Vander Veen et al. | |
| 2004/0026136 A1 | 2/2004 | Hill et al. | |
| 2004/0028199 A1 * | 2/2004 | Carlson | 379/93.21 |
| 2004/0039794 A1 * | 2/2004 | Biby et al. | 709/217 |
| 2004/0062367 A1 | 4/2004 | Fellenstein et al. | |
| 2004/0155909 A1 | 8/2004 | Wagner | |
| 2004/0203977 A1 * | 10/2004 | Kennedy | 455/518 |
| 2004/0240163 A1 | 12/2004 | Adams et al. | |
| 2005/0267975 A1 | 12/2005 | Qureshi et al. | |
| 2006/0015819 A1 | 1/2006 | Hawkins et al. | |
| 2006/0033706 A1 | 2/2006 | Hawkins et al. | |
| 2006/0121938 A1 | 6/2006 | Haitani et al. | |
| 2006/0160566 A1 * | 7/2006 | Plahte et al. | 455/554.1 |
| 2006/0161858 A1 | 7/2006 | Hawkins et al. | |
| 2006/0168539 A1 | 7/2006 | Hawkins et al. | |

FOREIGN PATENT DOCUMENTS

| | | |
|---|---|---|
| EP | 0704788 A2 | 4/1996 |
| FR | 2760933 | 9/1988 |
| WO | WO99/08238 A1 | 2/1999 |
| WO | WO01/13605 A2 | 2/2001 |

OTHER PUBLICATIONS

Cowart, R., Matering Windows 95- The Windows 95 Bible, (1995), 110117, 352-359.

Dyszel, B., "Handspring Visor for Dummies", IDG Books Worldwide, Inc, (2000), o. 13, 15, 121, 122, 123, 208.

Plumley, B., "Ten Minute Guide to Windows NT Workstation 4.0", Que, (Aug. 1996).

"PCT International Search Report", Publication WO 01/13605 A3, (Feb. 22, 2001).

"Excerpts from Handspring VisorPhone(TM) User's Guide, Copyright 2000 Handspring, Inc.".

"Printout of various website pages from biz.yahoo.com article " Conference Calling Added to BestNet's Service Designed for Palm OS(R) Handhelds" - Tuesday, Aug. 21, 2001".

""An Introduction to Mobile Messaging," Mobile Messaging, May 2003, [online] [Retrieved on Dec. 10, 2004] Retrieved from the Internet: URL: http://www.lebodic.netlintro.htm".

"3GPP2 Multimedia Messaging System - MMS Specification Overview - Revision: A. Mobile Messaging, May 2003, [online] [Retrieved on Dec. 10, 2004] Retrieved from the internet: URL: http://www.lebodic.net/left.htm".

Agrawal, P. et al., "Get Wireless: A Mobile Technology Spectrum", IT PRO, IEEE, (Jul./Aug. 1999), 18-23.

"American Programmer, American Programmer, Inc., NY", (Dec. 1999), 4-33.

"At Last Technology Harness [sic] One of the Most Powerf [sic] Forces known to Men.", GO Corporation, 14 pages, Foster City, (1991).

"AT&T New RElease, NCR Cuts Price of 3170 Notebook Computer 11 to 19 Percent", 2pages, [online] , retrieved from the Internet: URL: http://www.att.com/press/0393/930308.nca.html., (Mar. 8, 1993).

Caar, R.M. "The Point of the Pen", Byte, Reprinted, Feb. 1991, 10 pages.

Chan, E. et al., "Personal Digital Assistants & Wireless Convergence", MGMT 557 Strategic Management of Innovation, (May 4, 2004), 1-28.

"Communications Solutions (TM) TMC Labs Test Drive, Mar. 2000", Retrieved from the Internet: URL: https://www.tmcnet.com/articles/comsol/0300/0300labs1.htm.

"Definition of Handheld Computer, printed from the website: http://searchmobilecomputing.techtarget.com, dated Feb. 11, 2004 (3pgs).".

"Definition of Handheld, printed from the website: http://searchmobilecomputing.techtarget.com, dated Feb. 11, 2004 (3 pgs)".

Cullen, A. "Connecting with Your EO Cellular Module", EO, Inc. Mountain View., (1992, 1993),ii-33.

Cullen, A. "Getting started with Your EO Personal Communicatior", EO, Inc., Mountain View, (1992, 1993),ii-74.

Cullen, A. "Lookup Guide to the EO Personal Communicator", EO, Inc., Mountain View., (1992, 1993), ii-320.

"Go Corporation Information Statement, 218 pages", (Nov. 8, 1993).

"Handheld Game Console - Wikipedia, the free encyclopedia, [online] [Retrieved on Oct. 13, 2006], Retrieved from the Internet: URL: http://en.wikipedia.org/wjkwHandheld_game_console."

"Hewlett Packard, Products and Services, http://www.hp.com/, Nov. 11, 2001."

"IBM Selects Racotek Data/Voice Communications Services to Interface with Touchmobile Product, PR Newswire, Jan. 26, 1993, 2 pages."

"IBM TouchMobile Solution for Data Capture and Communication, Keeping Your Business Moving in the 90s, International Business Machines Incorporated, Jan. 1993, 13pages."

"IBM TouchMobile Information and Planning Guide, International Business Machines Incorporated, Mar. 1993, 20 pages."

"IBM'S Touchmobile Helps Field Workers Collect Data at the Touch of a Finger, PR Newswire, Jan. 26, 1993, 1 page."

Maki, K. "The AT&T EO Travel Guide", John Wiley & Sons, Inc., N.Y, 1993, iii-555.

Ikeya, B. "Detailed Overview of the PC Card Standard, PCMCIA", http ;//pcmcia.org/pccarcJstandard.htm., (1998).

"Introduction to PCMCIA Technical Tutorial, Dec. 6, 2002. pp. 1-11."

"Nokia Introduces Mobile Chat With Nokia 3310", http://www.mobiletechnews.com/info/2000/09/01/1_42022.htm, (Sep. 1, 2000).

"Nokia, Frequently Asked Questions", http://www.nokia.co.in/nokiaapac/india/faqs_list/0,18778,39_41,00.html.

Kanellos, M. "Qualcomm Merges Phone, Handheld", CNET News.com, Sep. 21, 1998, http://www.news.com/Qualcomm+merges+phone%2C+handheld/2100-1001_3-215791.html.

"PCT International Search Report", PCT/US2000/22182, (Jan. 10, 2001), 8 pages.

"PCT Notification of Transmittal of International Preliminary Examination Report", PCT/US2000/22182, (Oct. 26, 2001), 6 pages.

"pdQ (TM) Basics Handbook", Qualcomm Incorporated,, (1998, 199), 96 pages.

MacNeill, D. "Messaging Card and NewtonMail: We Pick Up and Deliver", On The Go Magazine, http://www.pencomputing.com/Newton/NewtonNotes2.html. 2 pages.

Powell, E. "Kyocera pdQ Smartphone - Brief Article - Product Announcement,", http://www.findarticles.com/plartjdes/mjmOFAUTis917/ai65650619/print., (2000).

MacNeill, D. "Wireless Newton Technology Goes to Work", On The Go Magazine, Ovt 13, 1993, 2 pages, http://www.pencomputing.com/Newton/NewtonNotes2.html.

"Qualcomm pdQ (TM) 1900 Digital PCTS SmartPhone", Qualcomm Incorporated, (1999), 2 pages.

Schlender, B.R., "Hot New PCs That Read Your Writing", Fortune, Reprinted, (Feb. 11, 1991), 6 pages.

Shah, R. "The Qualcomm pdQ: Kill Two Birds with One Phone", CNN.com, http://archives.cnn.com/i999rrECHJptechJi2/o3/qualcomm.pdq, (Dec. 3, 1999).

Stock, R. "The World of Messaging An Introduction to Personal Communications", EO, Inc., Mountain View, (1992, 1993), pp. ii-69.

"The Handheld Computing Industry - 2000", Stanford Technology Ventures Program (STVP), (jan. 13, 2001), pp. 1-38.

"T-MobileProducts; Handhelds", http://www.tmobile.com, (Sep. 28, 2002), 2 pages.

"T-Mobile Products; Sidekick", http://www.tmobile.com, Sep. 28, 2002, (Sep. 28, 2002), 3 pages.

"Toshiba Computer Systems Group", http://www.toshiba.com, (May 28, 2002), 1 page.

"Toshiba Computer Systems Group: Pocket PC e570", http:www.pda.toshiba.com, (Jul. 7, 2001), 2 pages.

"Excerpts from Motorola Timeport Tri-Band Mobile Telephone Manual, copyright 1999 Motorola, Inc.".

"Excerpts from Ericsson Mobile Phone 1888 WORLD User's Guide, Copyright 1988 Ericsson Mobile Communications AB".

"Printout of various website pages from www.bestnetcall.com regarding pdaCall (patent pending), printed Aug. 31, 2001".

* cited by examiner

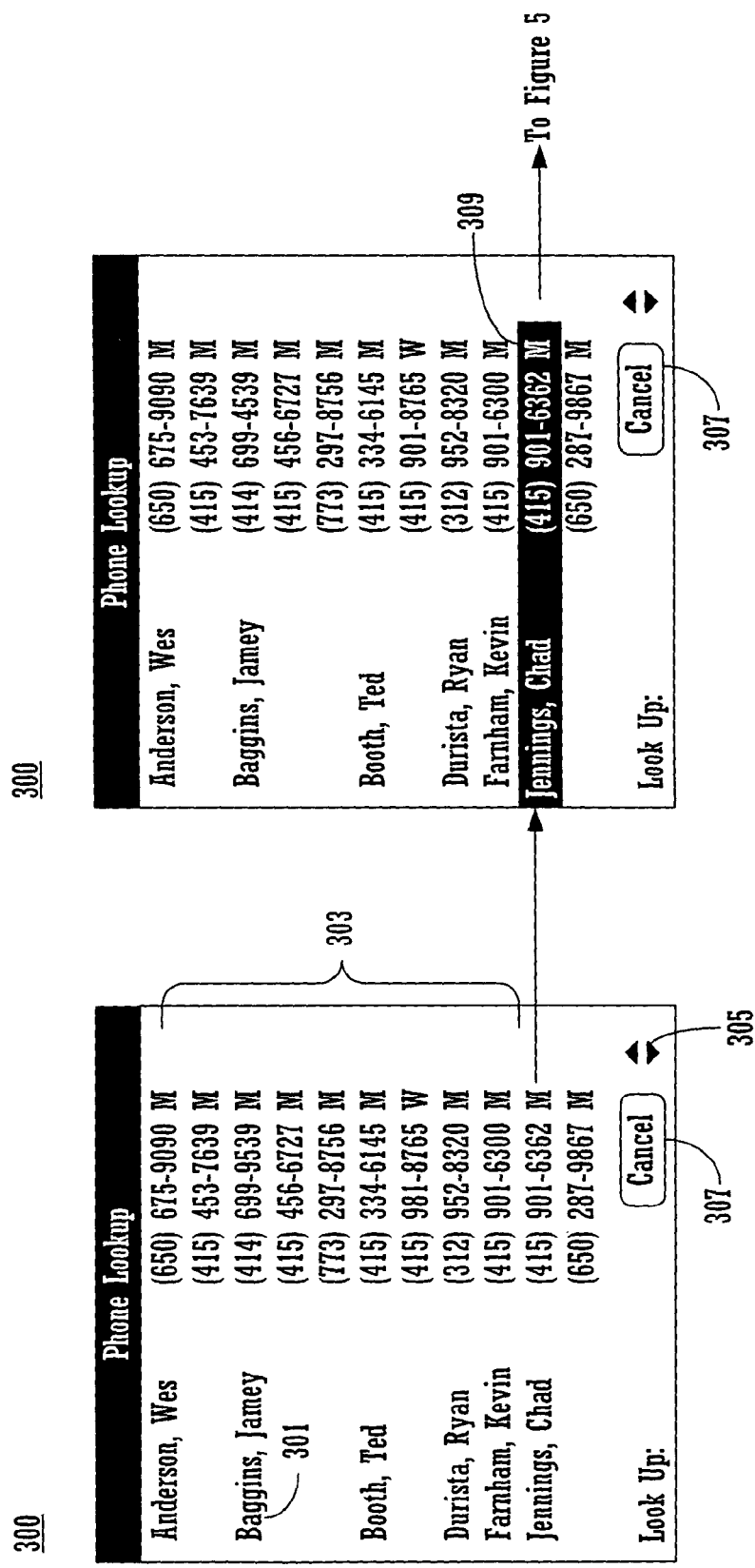

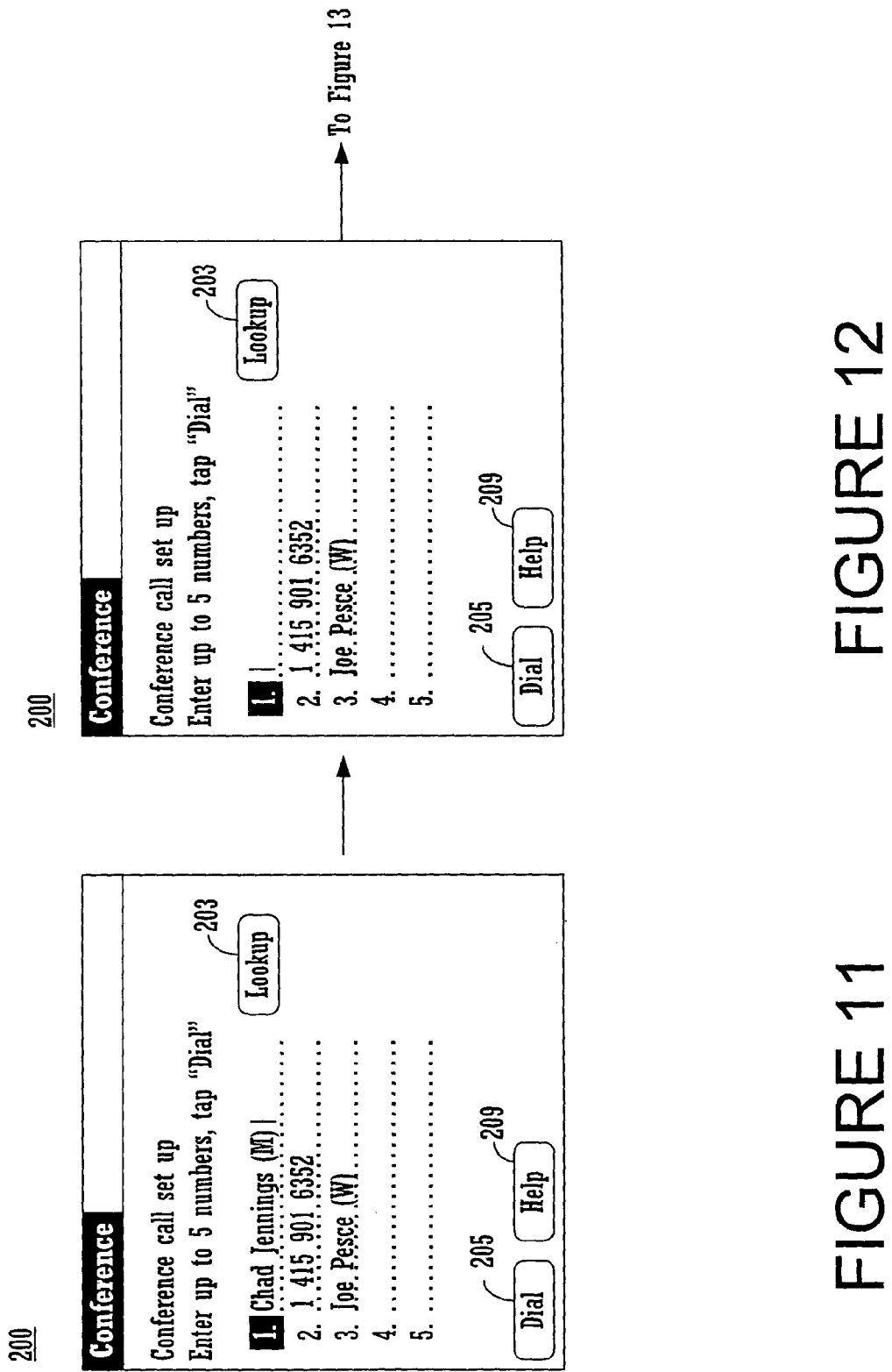

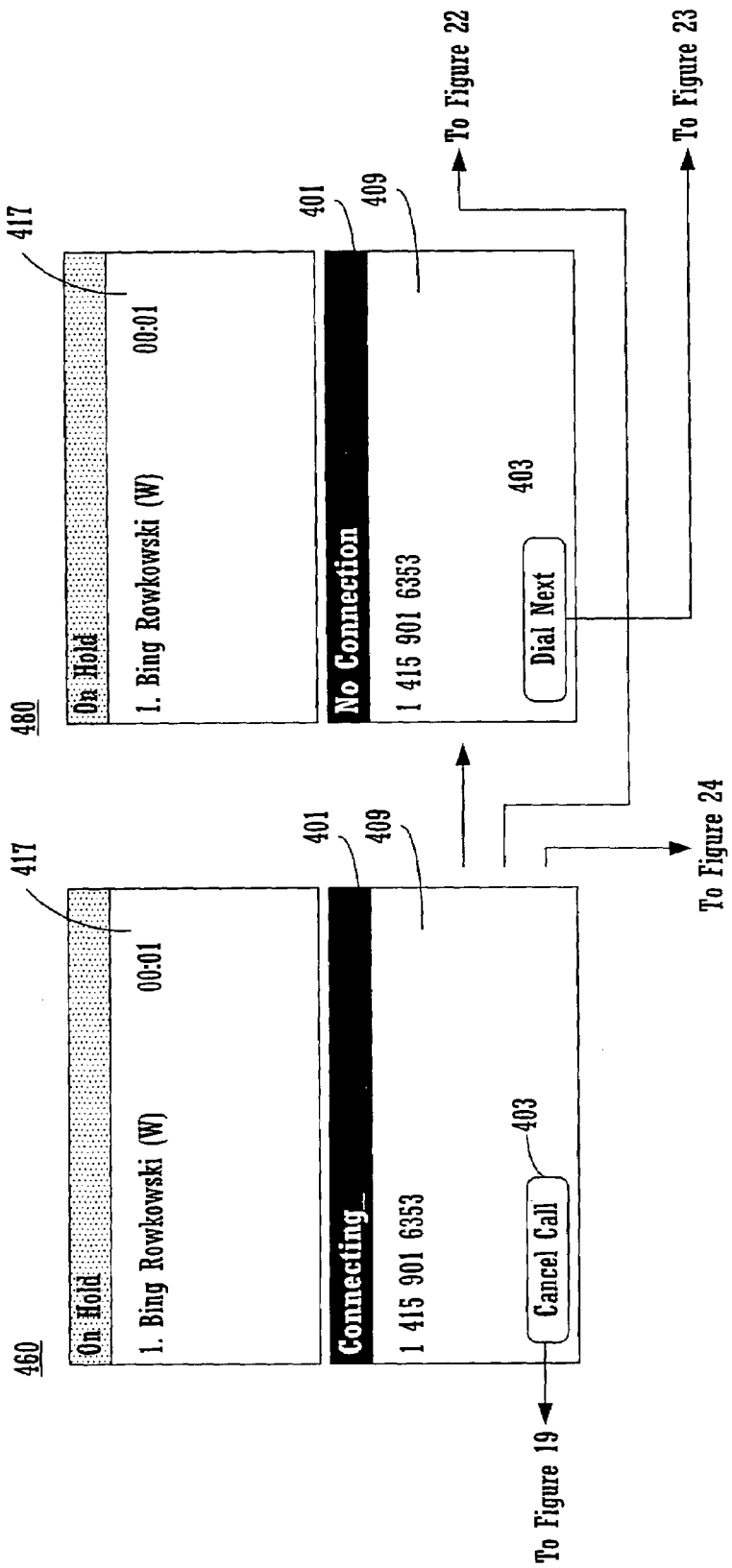

AUTOMATED TELEPHONE CONFERENCING METHOD AND SYSTEM

RELATED U.S. APPLICATIONS

This application incorporates herein by reference, and claims priority to, the commonly-owned co-pending provisional patent. application U.S. Ser. No. 60/467,794, entitled "MULTI-MODE CONFERENCE CALL SETUP AND MANAGEMENT AND DATA BROWSING USER INTERFACE TECHNIQUE ('MULLET DATEBOOK') AND DYNAMIC SIZING USER INTERFACE TECHNIQUE FOR DATA DISPLAY AND TEXT-KEY CUSTOMIZATION FOR AUDIO MENU SELECTION," filed May 1, 2003, and to the commonly-owned U.S. Pat. No. 6,516,202 B1, entitled "MOBILE COMPUTER SYSTEM DESIGNED FOR WIRELESS COMMUNICATION EXPANSION," issued on Feb. 4, 2003, and assigned to the assignee of the present invention.

FIELD OF THE INVENTION

Embodiments of the present disclosure relate generally to computing systems. In particular, embodiments of the present disclosure relate to a method and system for automated telephone conferencing using a portable computing system.

BACKGROUND OF THE INVENTION

The miniaturization of components used in the construction of computer systems has resulted in the emergence of new categories of computing devices. One such new category of computing device includes the so called hand held computing systems. A handheld computer system is small enough to be held in the hand of a user. Handheld computing systems have traditionally been used in the performance of various functions that require computing including personal organization tasks, wireless e-mail receipt and transmission, note-taking, and electronic games.

An area that has not heretofore been affected by handheld computing is telephonic conferencing applications. Conferencing is an important tool in today's corporate environment. Individuals need to be brought together in an effort to achieve important corporate goals. However, as a result of the severe time demands that many corporate professionals and executives are confronted with, it is often literally impossible to bring the important players together physically for each meeting. Consequently, telephonic conferencing schemes have begun to emerge.

Conventional telephonic conferencing schemes typically involve the manual ascertainment and dialing of each of the prospective conference participants telephone numbers. It should be appreciated that all of the tasks involved in telephonically convening the prospective conference participants such as redialing prospective participants when a line is busy, or where no connection is achieved must be performed manually. The tedious task involved in operating such systems render such systems inefficient and undesirable.

SUMMARY OF THE INVENTION

Accordingly, a need exists for a method and system for automated telephone conferencing. The present invention provides a method and system that accomplishes this need.

A computer implemented method of conducting a teleconference is disclosed. The method includes selecting a group of potential conferees using a graphical user interface tool displayed on a display screen, automatically setting up the teleconference by accessing telephone numbers for each conferee of the group of potential conferees and individually attempting to make contact with the group of potential conferees over a telephone system. The method further includes updating contact status information for the group of potential conferees during the automatic set up of the teleconference. A teleconference is established between the available conferees of the group of potential conferees.

A computer implemented method of electronically convening conferees is disclosed. The method includes selecting one or more prospective electronic conferees and presenting information corresponding to the one or more prospective conferees on a computer display. The method further includes employing conferencing control resources associated with the display to electronically and automatically convene the one or more prospective electronic conferees based on the information such that communication among the one or more prospective electronic conferees is facilitated. In one embodiment, the method may be implemented on a portable computer system having wireless telephone capabilities.

A conferencing system is also disclosed. The system includes a processor, a memory, a display for presenting information about prospective conferees and conferencing control resources associated with said display. The conferencing control resources are employed to cause prospective conferees to be automatically convened telephonically. Information regarding the status of conferees and the telephonic conference may be mirrored to each conferee that has joined the conference.

A conferencing system is disclosed. The system includes a processor and a memory associated with a display. Moreover, the system includes conferencing control resources associated with said display. The conferencing control resources are employed to cause prospective conferees to be automatically convened telephonically based on information accommodated by said display. The system may utilize a portable computing device having wireless telephone capabilities.

In one embodiment, a user interface on a display screen may be used to select a group of potential conferees, e.g., from among a listing as found in an electronic address book application. Or, a group of potential conferees may be pre-established and stored under a grouping identification. Once selected, the portable computer, or other electronic device, automatically attempts to contact each potential conferee and when contacted, automatically plays a recorded message indicating that participation in the conference is requested. Telephonically, contacted conferees are then allowed to join the conference.

An on-screen user interface illustrates the connection and contact status for each conferee, e.g., connected, not available, on-hold, etc. Gathering the telephone numbers for each contact, calling them, connecting them to the conference and maintaining conference status are all done automatically by the electronic computing device. Special telephone functions such as mute, hang-up, etc. can be applied to any conferee by merely selecting the on-screen conferee name and then selecting the appropriate function. Conference status information can be mirrored to each connected conferee.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3 shows a phone number lookup menu of an automated telephone conferencing system according to one embodiment of the present invention.

FIG. 4 illustrates the use of the phone number lookup menu to facilitate a selection of a prospective conferees phone number according to one embodiment of the present invention.

FIG. 11 illustrates the use of the up/down button function to control the movement of the highlight bar within the list provided by the conference call setup menu in order to select a number for deletion according to one embodiment of the present invention.

FIG. 12 illustrates the use of a provided button/function to effect the deletion of a number from the conference call setup menu call setup list according to one embodiment of the present invention.

FIG. 20 illustrates the appearance of a call setup menu when an attempted connection is made while a call conferee is on hold according to one embodiment of the present invention.

FIG. 21 illustrates the appearance of a call setup menu when an attempted connection fails while a call conferee is on hold according to one embodiment of the present invention.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. An procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "employing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
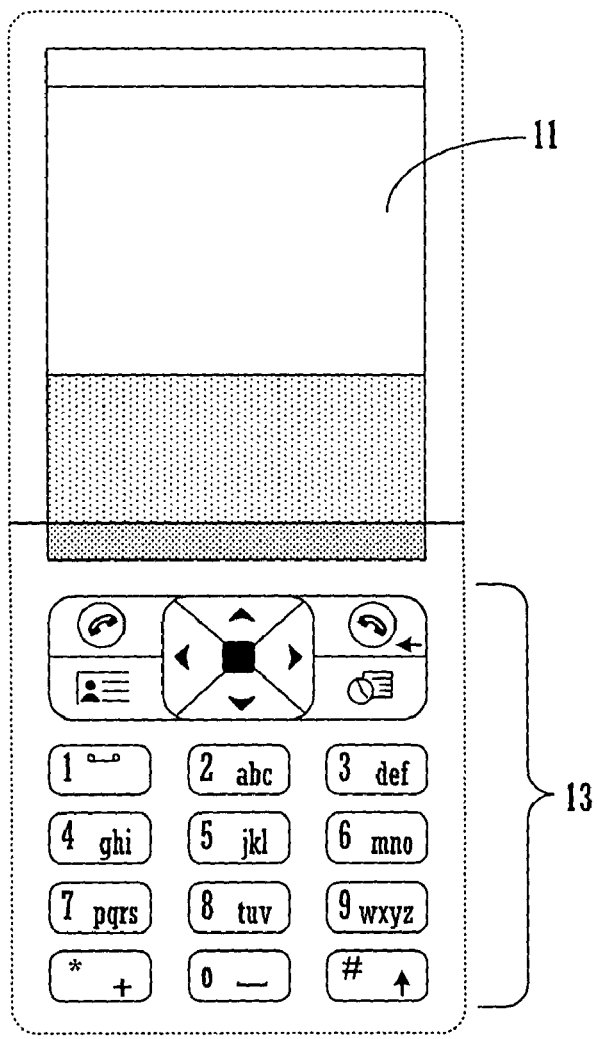
FIG. 1A shows a portable computing device with wireless telephone capabilities and having a display screen according to one embodiment of the present invention.

Automated Telephone Conferencing System
According to Embodiments of the Present
Invention FIG. 1A shows a portable computing device 10 having a display screen 11 and wireless telephone capabilities that may be employed in the presentation of the automated telephone conference call setup and control menus that are described herein. Computing device 10 may also include computing device keypad hard buttons 13 that may be employed as a means of inputting data. It should be appreciated that according to one embodiment, the portable computing device 10 may be hand held and may also accommodate the utilization of handwriting recognition (made such as through the use of a stylus and digitizer) as a means of inputting information for the purpose of controlling processes and functionality of the automated telephone call conferencing system described herein.

Conference Call Setup Operations

FIGS. 1B-16 show conference call setup menus of an automated telephone conferencing system that may be presented to the automated conferencing systems users during initial conference call setup operations according to one embodiment of the present invention. The conference call setup menus that are shown in FIGS. 1B-16 guide a user through a process of building a list of prospective conference call conferees to be convened for a prospective conference call. According to one embodiment, the telephonic convening of the listed prospective conference call conferees may be automatically executed through the herein described automated processes of the automated telephone conferencing system of the present invention.

Figures 1B, 2:
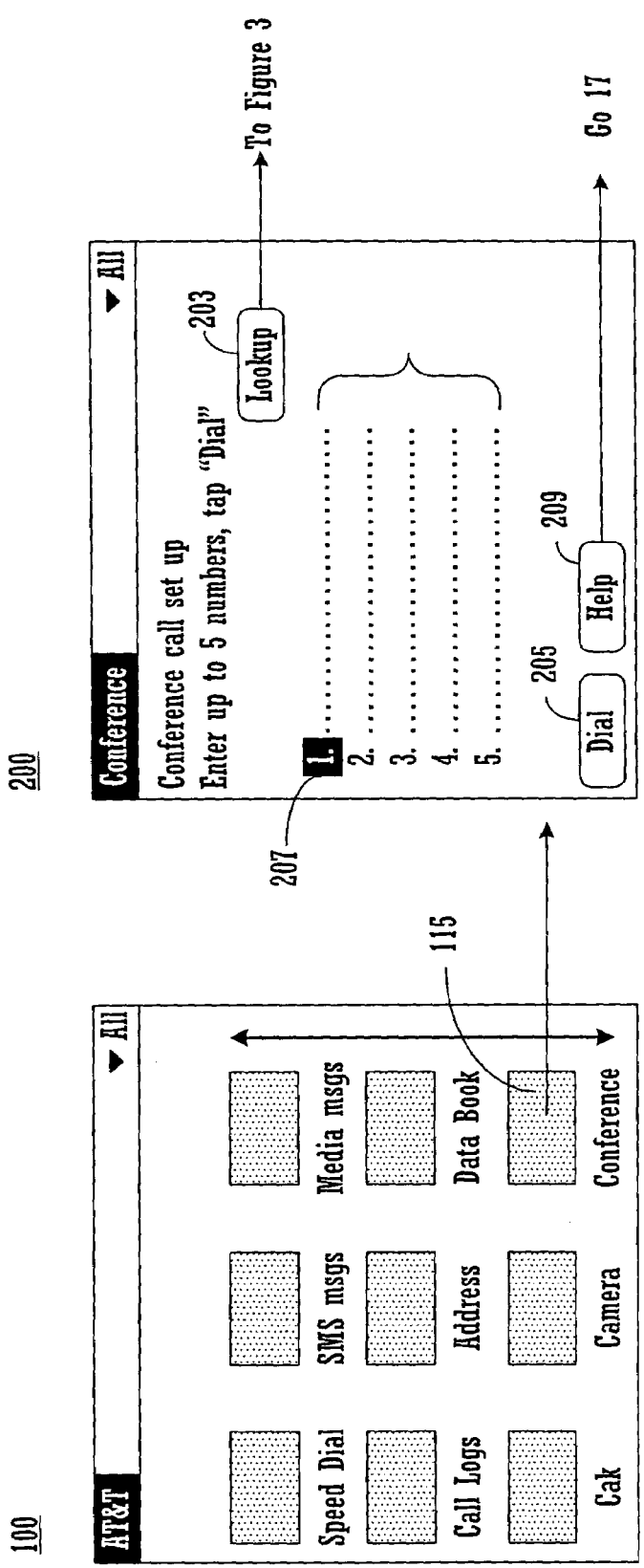
FIG. 1B shows an on-screen menu of the automated telephone conferencing system that facilitates the launching of telephonic conferencing operations according to one embodiment of the present invention.
FIG. 2 shows an on screen telephone conferencing systems conference call setup menu according to one embodiment of the present invention.

FIG. 1B shows a menu 100 of the automated telephone conferencing system that facilitates the launching of telephonic conferencing operations according to one embodiment of the present invention. Menu 100 displays text-key button/functions that may be employed to initiate or access functionalities and features provided by the automated telephone conferencing system. The button/functions that are displayed in menu 100 may include but are not limited to "speed dial", "SMS msgs", "camera", "call logs", "address", "data book", "calculator", "expense", and "conference phone" (e.g., 115).

According to one embodiment, the selection of the "conference phone" text-key button/function 115 displayed in menu 100 triggers the launching of the systems automated telephone conferencing operations according to one embodiment of the present invention. It should be appreciated that the selection of the conference phone text-key button/function 115 prompts a conference call set up menu 200 to be presented for display to a system user.

FIG. 2 shows a telephone conferencing systems conference call setup 25 menu 200 according to one embodiment of the present invention. Conference call setup menu 200 includes a call setup list 201, a lookup button function 203, cursor 207 and a dial button function 205. According to one embodiment, the telephone numbers of prospective call conferees may be entered onto the "caller lines" (see FIG. 2) of the call setup list 201. It should be appreciated that several prospective call conferees may be added to the call setup list so that they may be convened for telephonic conferencing purposes. The entry of a prospective conferees number onto a caller line may be effected by highlighting a caller line with a blinking cursor (e.g., 207). After the caller line is highlighted, a blinking lookup text-key button/function 203 may appear next to that caller line in the call setup list 201 to facilitate a lookup of a prospective conferees phone number (see FIG. 3) for listing on that line.

FIG. 3 shows a telephone number lookup menu 300 of an automated telephone conferencing system according to one embodiment of the present invention. According to one embodiment, telephone number lookup menu 300 is presented upon the selection of the lookup text-key button function 203 discussed with reference to FIG. 2. Telephone number lookup menu 300 includes names of prospective conferees 301, telephone numbers of prospective conferees 303, scroller button/function 305, and cancel button/function 307.

FIG. 4 illustrates the use of the telephone number lookup menu 300 to facilitate a selection of a prospective call conferees name and telephone number according to one embodiment of the present invention. FIG. 4 shows in addition to the items enumerated above with reference to FIG. 3, prospective conferee name/number highlight bar 309. According to one embodiment, a user may select a prospective call conferee 303 to be added to the call setup list (e.g., 201) by using the scroller button/function 305 (or using a stylus such as by "tapping") to move the name/number highlight bar 309 to highlight a telephone name and number of a prospective conferee 303 that is desired to be added to the call setup list (e.g., 201).

Figure 5:
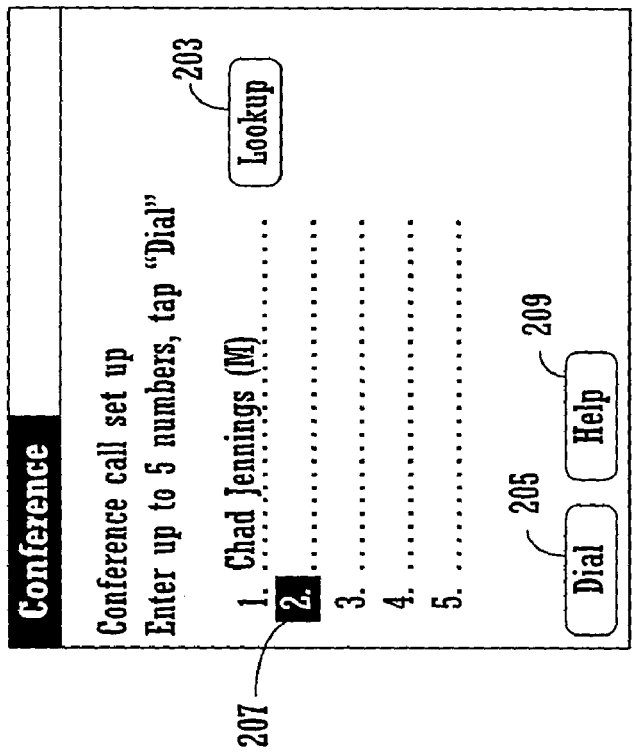
FIG. 5 illustrates the copying of a selected number to the call setup list of conference call setup menu according to one embodiment of the present invention.

FIG. 5 illustrates the copying of a selected number to the call setup list of conference call setup menu 200 according to one embodiment of the present invention. According to one embodiment, once the user selection of a prospective conferee is completed (as discussed with reference to FIG. 3 and FIG. 4) the selected number is copied onto the highlighted line of call setup menu 200 and the cursor 207 (highlight) moves down to the following line.

Figure 6:
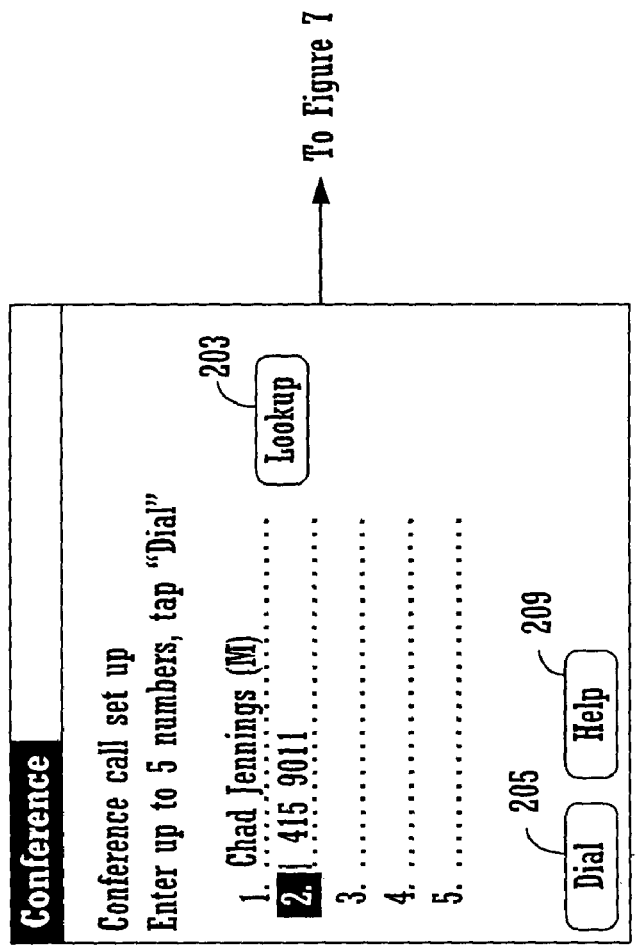
FIG. 6 illustrates the use of the keypad hard buttons to dial numbers of prospective call conferees according to one embodiment of the present invention.

FIG. 6 illustrates the use of the keypad hard buttons (e.g., 13) to dial numbers of prospective call conferees according to one embodiment of the present invention. Referring to FIG. 6, a number entered directly using the hard button keypad is copied onto a highlighted line of conference call setup menu 200. It should be appreciated that a movement of the cursor to the following line after the entry of the number may be controlled through the use of up/down button/function (e.g. 305).

Figure 7:
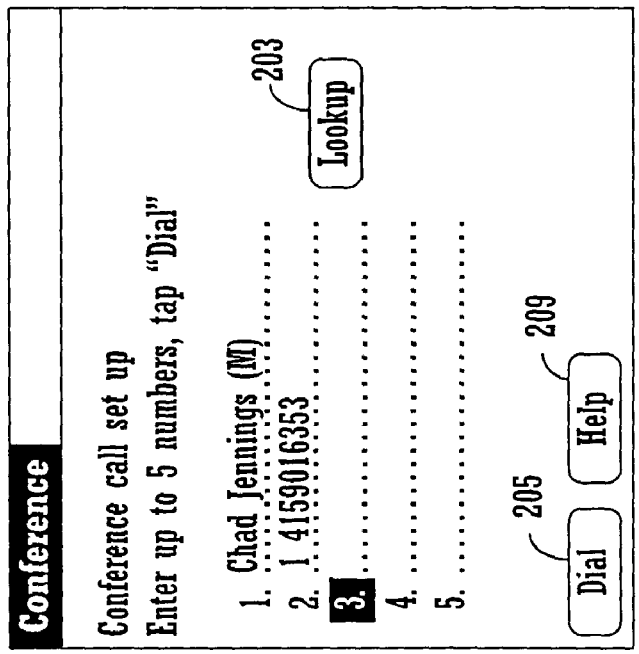
FIG. 7 illustrates the use of the up/down button/function to control movement of the highlight bar within conference call setup menu according to one embodiment of the present invention.

FIG. 7 illustrates the use of the up/down button/function to control movement of the highlight bar within conference call setup menu 200 according to one embodiment of the present invention. As is illustrated in FIG. 7, the highlight bar may be moved downward within the conference call setup menu 200 through the use of the up/down button function after a number is entered using the hard button keypad.

Figure 8:
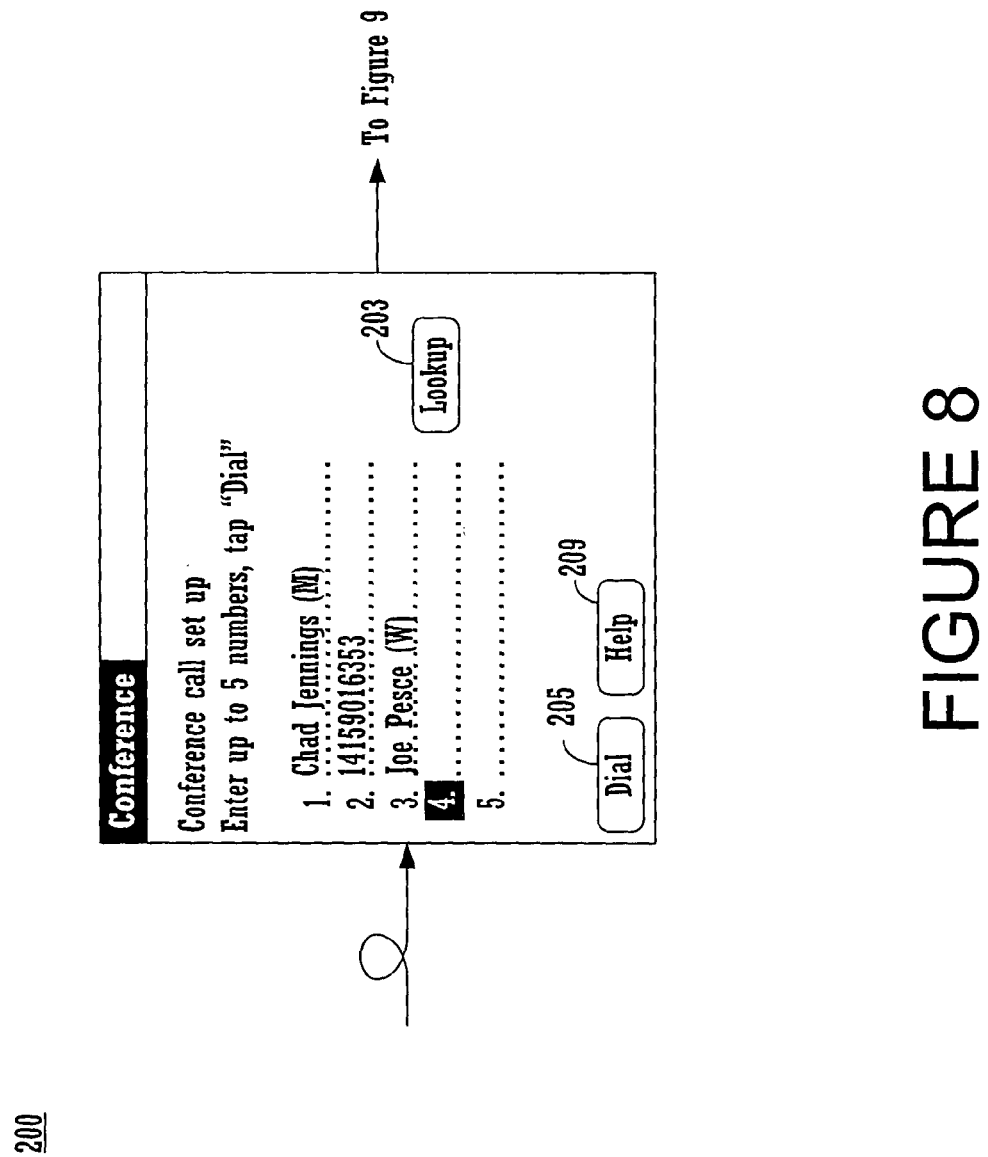
FIG. 8 illustrates the use of the lookup button/function to add a prospective call conferee to the call setup list in the conference call setup menu according to one embodiment of the present invention.

FIG. 8 illustrates the use of the lookup button function (e.g., 203) to add a prospective call conferee to the call setup list in the conference call setup menu 200 according to one embodiment of the present invention. As is illustrated in FIG. 8, the highlight bar (e.g., cursor 207) may be moved downward automatically after the call conferee is added using the lookup button function as described above.

Figure 9:
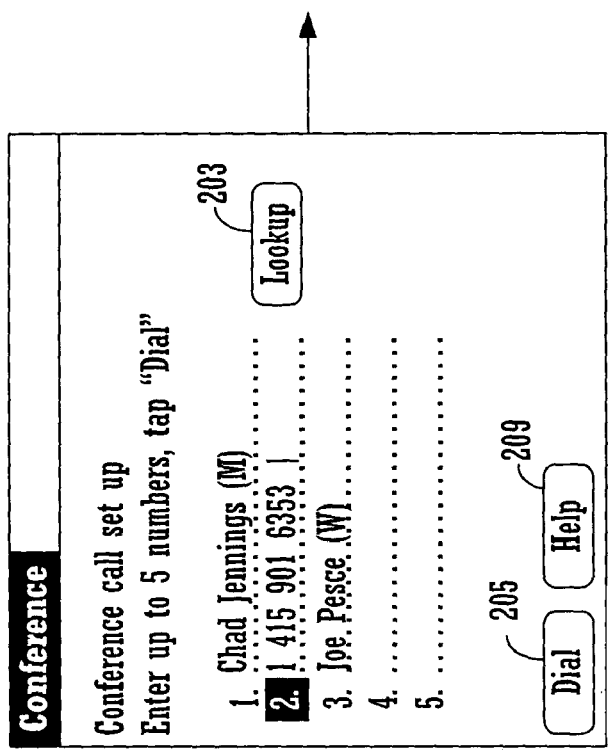
FIG. 9 illustrates the use of the up/down button function to control movement of the highlight bar within the call setup list provided by the conference call setup menu in order to select a number for deletion according to one embodiment of the present invention.

FIG. 9 illustrates the use of the up/down button function to control the movement of a cursor within the call setup list provided by the conference call setup menu 200 in order to select a call conferees number for deletion according to one embodiment of the present invention. It should be appreciated that a call conferees number may be selected for deletion either by using the up/down button function to control the movement of a cursor within the call setup list to reach the "caller line" containing the number, or by "tapping" (such as with a stylus) on the "caller line" that contains the number that is desired deleted. For example, as is illustrated in FIG. 9, by pressing the up/down button/function (e.g., 305) twice, the cursor may be moved from line 4 to line 2. In this manner the number of the call conferee contained on line 2 of the conference call setup menu (e.g., 201) may be selected for deletion. It is important to note that users may delete single characters present on a "caller line" by using a special purpose button/function (not shown) specifically provided for character deletion or by using automatic handwriting recognition.

Figure 10:
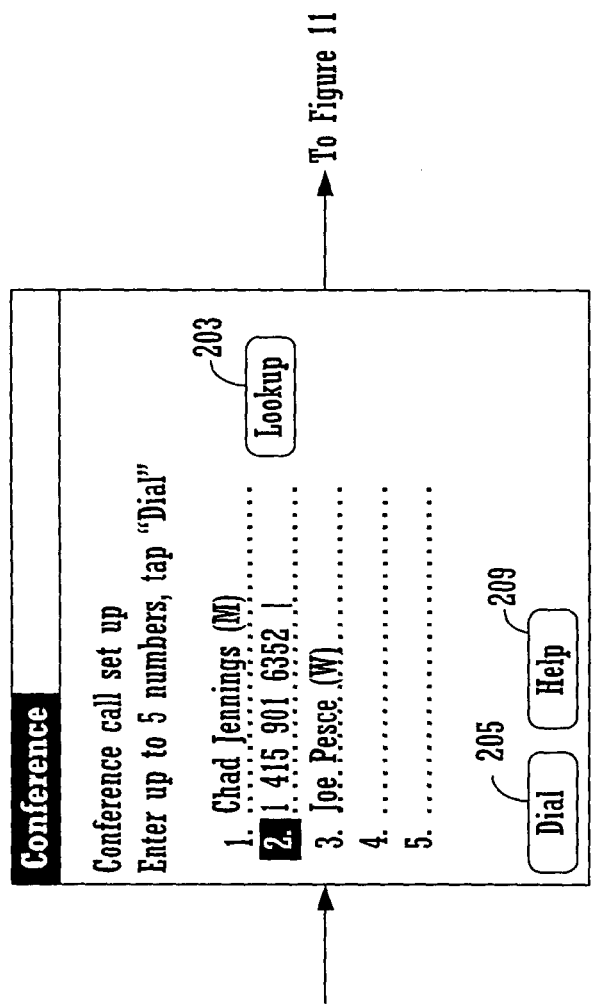
FIG. 10 illustrates the use of the hard button keypad to control movement of the highlight bar within the call setup list provided by the conference call setup menu in order to select a number for deletion according to one embodiment of the present invention.

FIG. 10 illustrates the use of the hard button keypad to control movement of the cursor within the call setup list provided by the conference call setup menu 200 in order to select a number for deletion according to one embodiment of the present invention. FIG. 10 illustrates the case where line number "2" is entered with a hard button keypad so that the number contained thereon may be deleted. It should be appreciated that this operation may also be effected through the use of handwriting recognition.

FIG. 11 illustrates the use of the up/down button function to control the movement of the cursor within the list provided by the conference call setup menu 200 in order to select a number for deletion according to one embodiment of the present invention. FIG. 11 illustrates the case where a line number is selected for deletion by moving the cursor up one space (from the location shown in FIG. 10) using the up/down button function. It should be appreciated that this operation may also be effected through the use of a hard button keypad and/or the use of handwriting recognition.

FIG. 12 illustrates the use of a button/function provided specifically to effect the deletion of a number from the conference call setup menu 200 call setup list according to one embodiment of the present invention. As is shown in FIG. 12, the name listed on line 1 of the conference call setup menu shown in FIG. 11 is deleted from the conference call setup menu shown in FIG. 12. It should be appreciated that the deletion of a number from the call setup list may be effected by the selection of a button/function (not shown)

that is specifically provided to effect such a deletion or by the performance of a single graffiti delete movement on the digitizer.

Figures 13, 14:
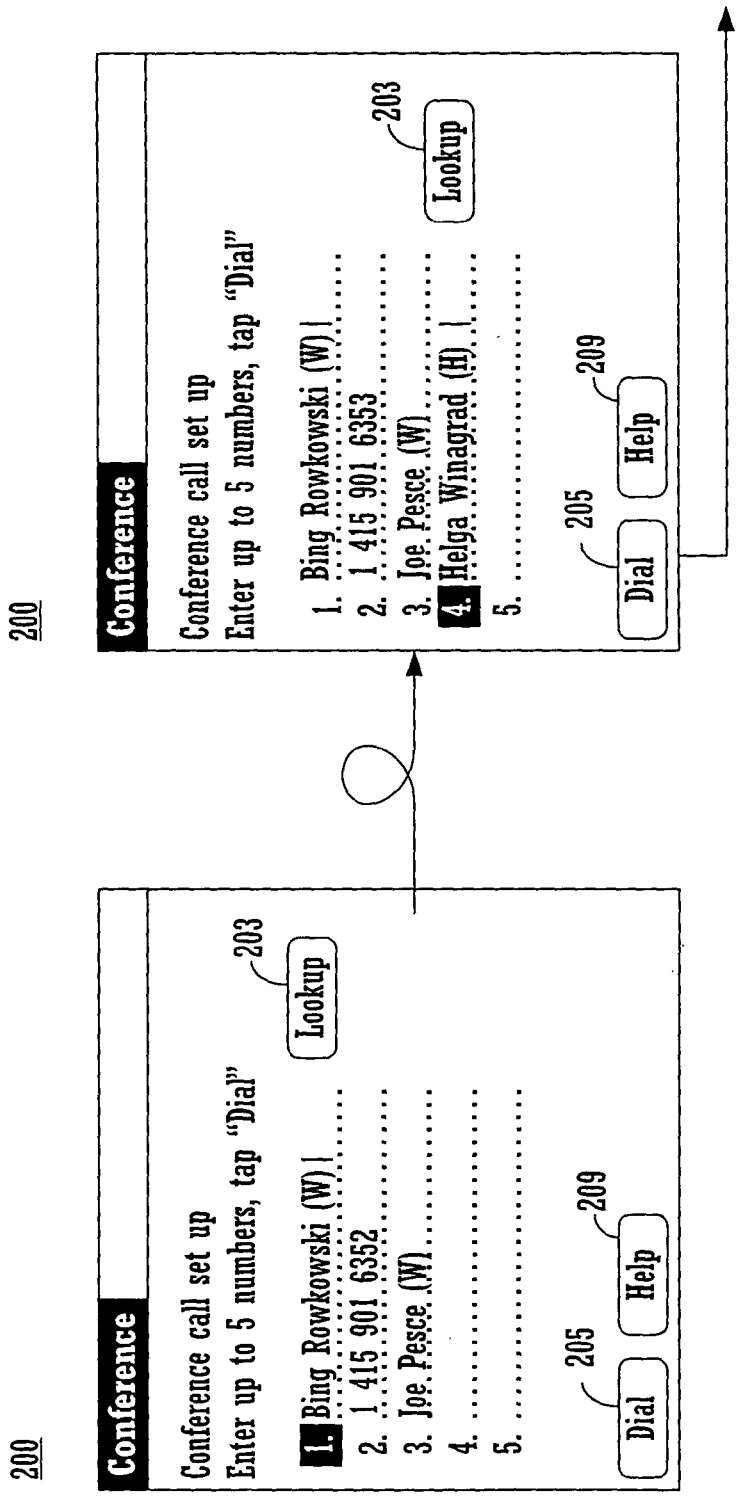
FIG. 13 illustrates the use of the lookup button/function to effect the addition of a number to the conference call setup menu call setup list according to one embodiment of the present invention.
FIG. 14 further illustrates the use of the lookup button/function to effect the addition of a number to the conference call setup menu call setup list according to one embodiment of the present invention.

FIG. 13 illustrates the use of the lookup button/function to effect the addition of a number to the conference call setup menu 200 call setup list according to one embodiment of the present invention. As illustrated in FIG. 13, a name is added to line 1 (shown as deleted or blank in FIG. 12) using the lookup button/function (e.g., 203) whose operation was discussed with reference to FIGS. 2-4. FIG. 14 further illustrates the use of the lookup button/function (e.g., 203) to effect the addition of a number to the conference call setup menu 200 call setup list according to one embodiment of the present invention. As illustrated in FIG. 14, a name is added onto line 4 of menu 200 (shown as blank in FIG. 13) using the lookup button/function 203. It should be appreciated that the call set up menu 200 and its contents may be mirrored onto other displays according to one embodiment.

Figure 15:
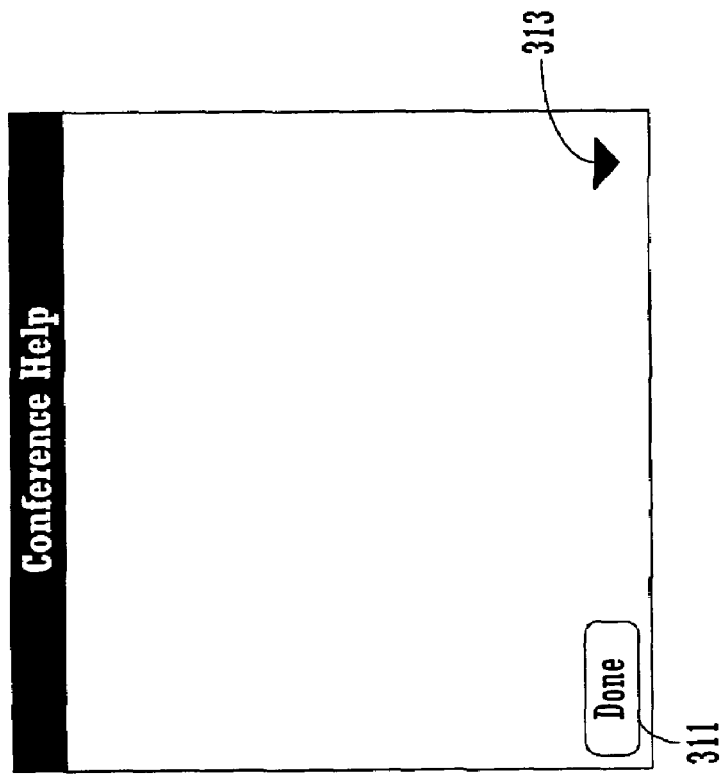
FIG. 15 shows a help menu according to one embodiment of the present invention.

FIG. 15 shows a help menu 310 according to one embodiment of the present invention. The help menu 310 may be presented after help button/function 209 is selected. According to one embodiment the help menu 310 explains the process of setting up a conference call. FIG. 15 also shows done button/function 311 and up/down button function 313. It should be appreciated that the done button/function 311 may be employed to close the help menu 310 while the up/down button function may be used to scroll the contents of the help menu 310.

Conference Call Dialing from Setup Menu

Figures 16A, 17:
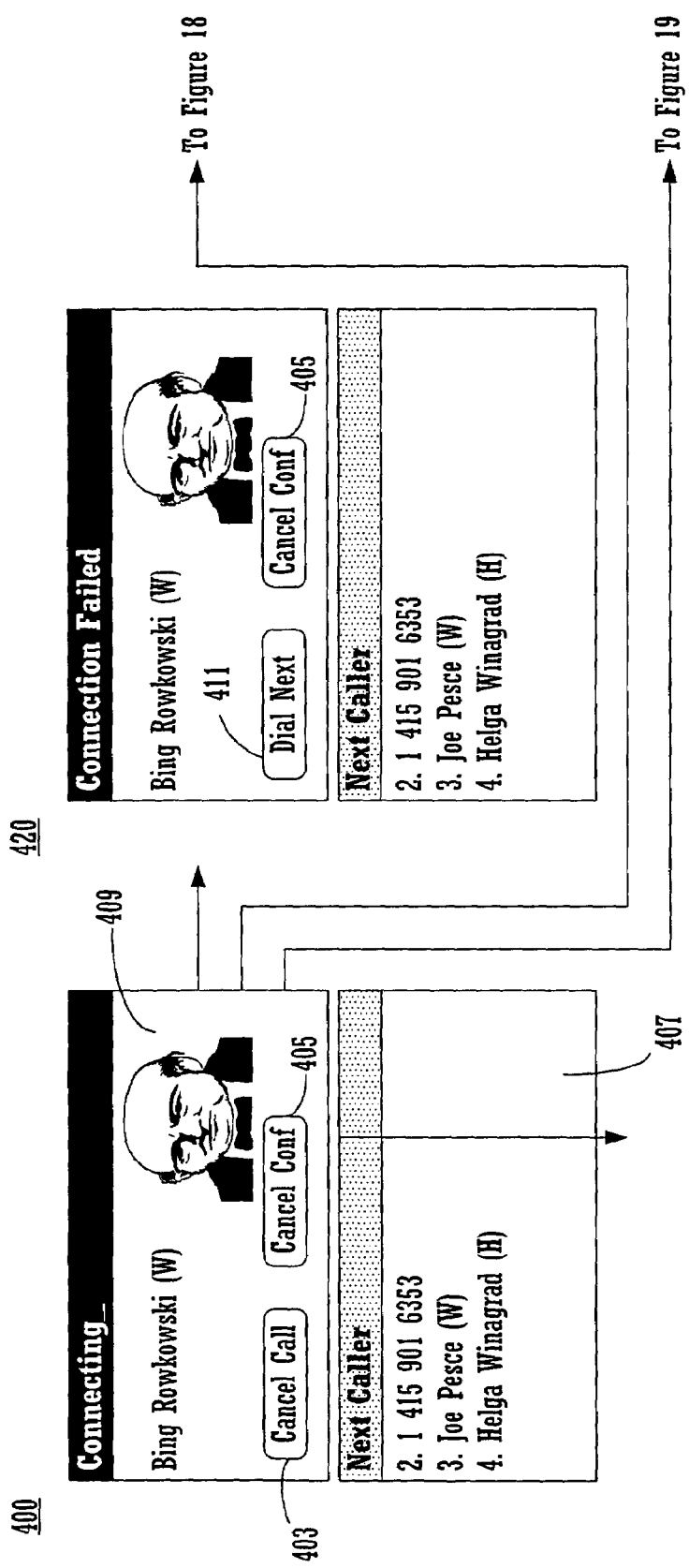
FIG. 16A shows a conference call dialing setup menu according to one embodiment of the present invention.
FIG. 17 illustrates a call setup menu after an attempted connection has failed according to one embodiment of the present invention.

FIG. 16A shows a conference call dialing setup menu 400 according to one embodiment of the present invention. According to one embodiment, when the "dial" text-key button/function (e.g., 205 in FIG. 14) is selected each of the listed prospective call conferees provided in the conference call setup list (e.g., 201) may be called in the listed sequence. It should be appreciated that the preset conference members may be called using a plurality of telephone numbers. The conference call dialing setup menu 400 lists the prospective call conferees that are to be dialed and presents connection status information (e.g., "connected", "failed", "busy" etc.) related to a call connection attempt that is being made.

Referring to FIG. 16A, there is shown call connection status area 4Q1, call cancel button/function 403, conference cancel button/function 405, conference call dialing list display area 407 and dialed conferee display area 409. As previously mentioned, according to one embodiment each number in the conference call dialing list display area 407 may be called in sequence. The call cancel button/function 403 may be used to terminate an individual call while the conference cancel button/function 405 may be employed to terminate an entire conference.

Figure 16B:
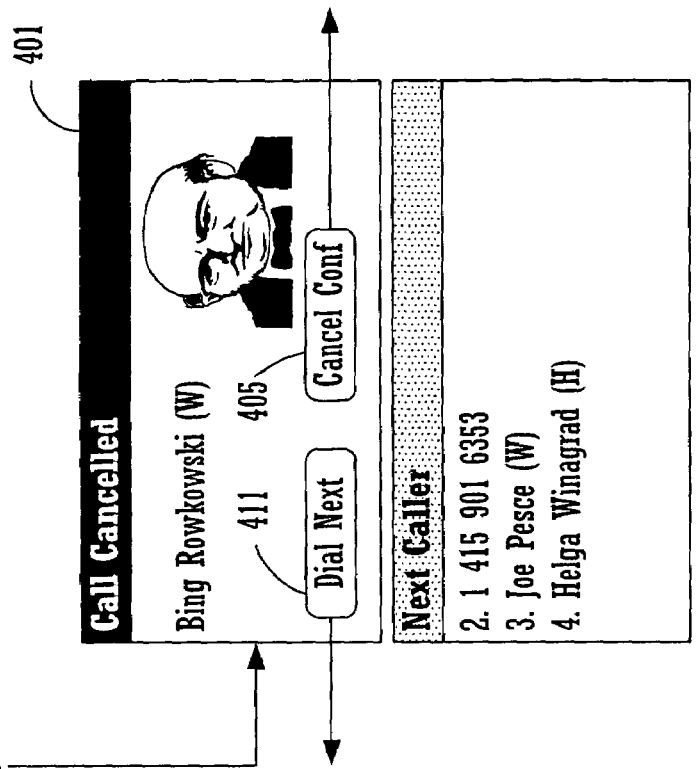
FIG. 16B illustrates a conference call setup menu after the call cancel button/function has been selected according to one embodiment of the present invention.

FIG. 16B shows the appearance of a conference call setup menu 420 after the call cancel button/function has been selected according to one embodiment of the present invention. According to one embodiment after the call cancel button/function 403 has been selected an attempted call is ended and the call status description "call-canceled" is displayed in the call connection status area 401. It should be appreciated that the FIG. 16B call setup menu 420 includes all of the structures enumerated above in the discussion made with reference to menu 400 of FIG. 16A except that the dial next button/function 411 replaces the call cancel button function 403 in the FIG. 16B conference call setup menu 420. Selecting the dial next button/function 411 identifies the next number in the sequence of numbers that are to be dialed and causes a connection attempt to be made to that number. It should be appreciated that if the conference cancel button/function 405 is selected the conference setup menu screen (FIG. 14) is again presented with all the data that was formerly entered therein presented intact.

FIG. 17 shows the appearance of a conference call setup menu 420 after an attempted conference call connection has failed according to one embodiment of the present invention. According to one embodiment once an attempted connection has failed the call status description "connection failed" is displayed in the call status display area. FIG. 17 shows dial next button/function 411 and conference cancel button/function 405. It should be appreciated that selecting the dial next button/function 411 at this point initiates a call to the next number in line in the sequence of numbers that have been selected to be called. It should be appreciated that if the conference cancel button/function 405 is selected then the conference setup menu (FIG. 14) screen may again be presented.

Figure 18:
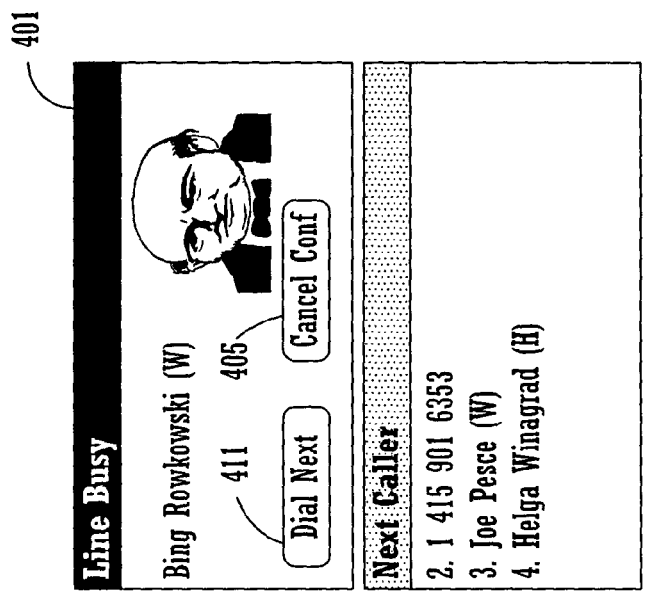
FIG. 18 illustrates a call setup menu when a line is busy according to one embodiment of the present invention.

FIG. 18 shows the appearance of a conference call setup menu 420 when a line is found busy according to one embodiment of the present invention. According to one embodiment, the call status description "line busy" is displayed in the call status area 401 when a line is busy. It should be appreciated that selecting the dial next button/function 411 at this point initiates a call to the next number in line in the sequence of numbers that have been selected to be called. According to one embodiment busy lines may be automatically redialed. It should be appreciated that if the conference cancel button/function 405 is selected then the conference setup menu screen may again be presented.

Figure 19:
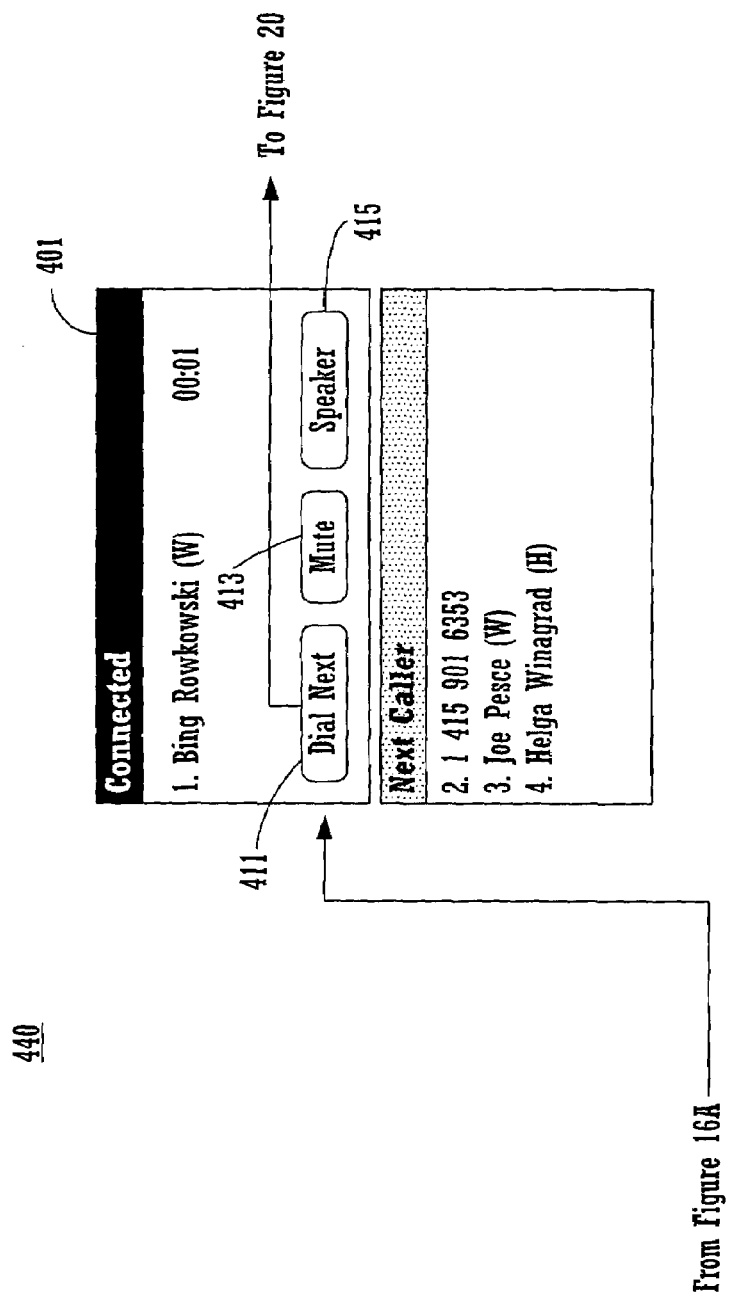
FIG. 19 illustrates the appearance of a call setup menu when connection is achieved according to one embodiment of the present invention.

FIG. 19 shows the appearance of a conference call setup menu 440 when a conference call connection is achieved according to one embodiment of the present invention. According to one embodiment, when a conference call connection is achieved the call status description "connected" is displayed in the call status display area 401. The FIG. 19 menu 440 includes dial next button/function 41 1, mute button/function 413 and speaker button/function 415. It should be appreciated that selecting the dial next button/function 411 initiates the dialing of the next number in line in the sequence of numbers that have been selected to be dialed. According to one embodiment, once a prospective call conferee has been successfully connected the next prospective call conferee may be dialed. It should be appreciated that the mute and speaker text-key button/functions may be employed to either mute a connected caller or place the connected caller on a speaker. According to one embodiment, the call time may be shown as a line item next to an individual callers name.

FIG. 20 shows the appearance of a conference call setup menu 460 when an attempted call connection is made while a call conferee is on hold according to one embodiment of the present invention. According to one embodiment, when this occurs the call status description "connecting" may be displayed in the call status display area 401 indicating that an attempted connection is being made. It should be appreciated that the number that is being called may be displayed on the viewer screen 409 as is shown in FIG. 20. The call conferee(s) who are on hold are displayed in viewer display 417.

FIG. 21 shows the appearance of a conference call setup menu 480 when an attempted connection fails while a call conferee is on hold according to one embodiment of the present invention. According to one embodiment, when an attempted connection fails while a call conferee is on hold the status description "no connection" may be displayed in the call status display area 401. It should be appreciated that the number that is being called may be displayed on the viewer screen 409 as is shown in FIG. 21. The call conferee(s) who are on hold are displayed in viewer display 417.

Figure 22:
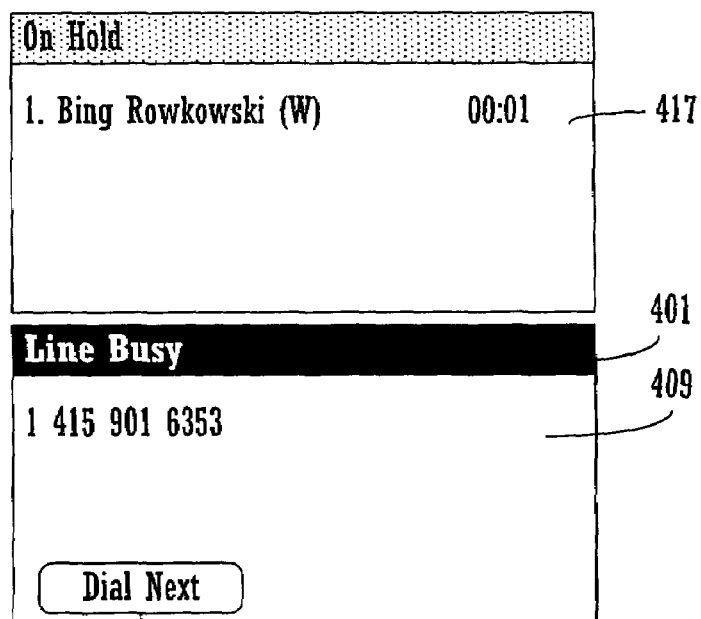
FIG. 22 illustrates the appearance of a call setup menu when an attempted connection to an additional call conferee results in a busy signal while there is a call conferee on hold according to one embodiment of the present invention.

FIG. 22 shows the appearance of a conference call setup menu 480 when an attempted connection to a prospective additional call conferee results in a busy signal while there is a call conferee on hold according to one embodiment of the present invention. According to one embodiment, when an attempted connection to an additional call conferee results in a busy signal while there is a call conferee on hold the status description "line busy" may be displayed in the call status display area 401. It should be appreciated that the number of the call conferee who is being called may be displayed on the viewer screen 409 of menu 480 as is shown in FIG. 22. The call conferee(s) who are on hold are displayed in viewer display 417.

Figure 23:
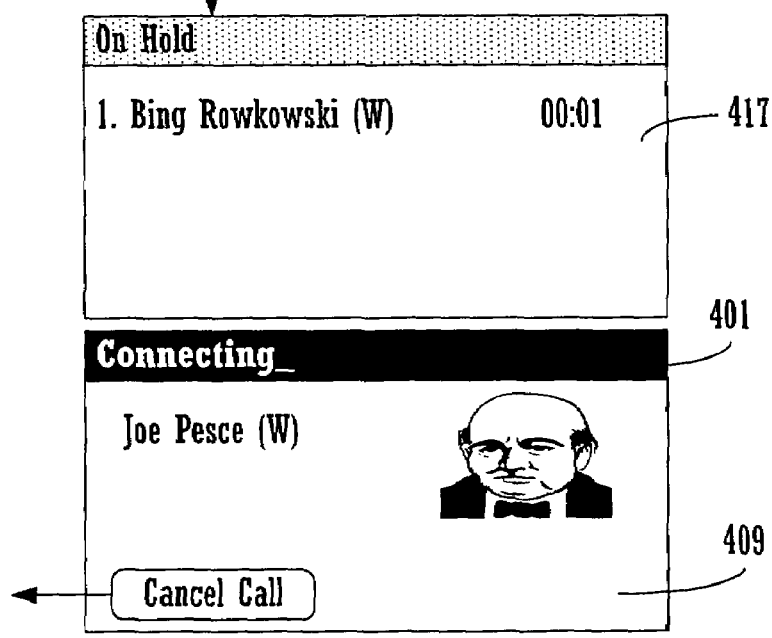
FIG. 23 illustrates the appearance of a call setup menu when a subsequent attempted connection is made while a call conferee is on hold according to one embodiment of the present invention.

FIG. 23 shows the appearance of a conference call setup menu 460 when a subsequent attempted connection to a prospective additional call conferee is made while a call conferee is on hold according to one embodiment of the present invention. According to one embodiment, when this occurs the status description "connecting" may be displayed in the call status display area 401 indicating that a connection attempt is in progress. It should be appreciated that the number of the call conferee who is on hold may be displayed on the viewer screen 417 of menu 460. Moreover, the number of the prospective call conferee being called may be shown in the conferee display area 409 of menu 460. According to one embodiment, if the attempted connection is achieved the user is presented with the menu shown in FIG. 24. However, if the attempted connection fails the user is presented with the menu shown in either FIG. 21 or FIG. 22.

Figures 24, 25A, 25B:
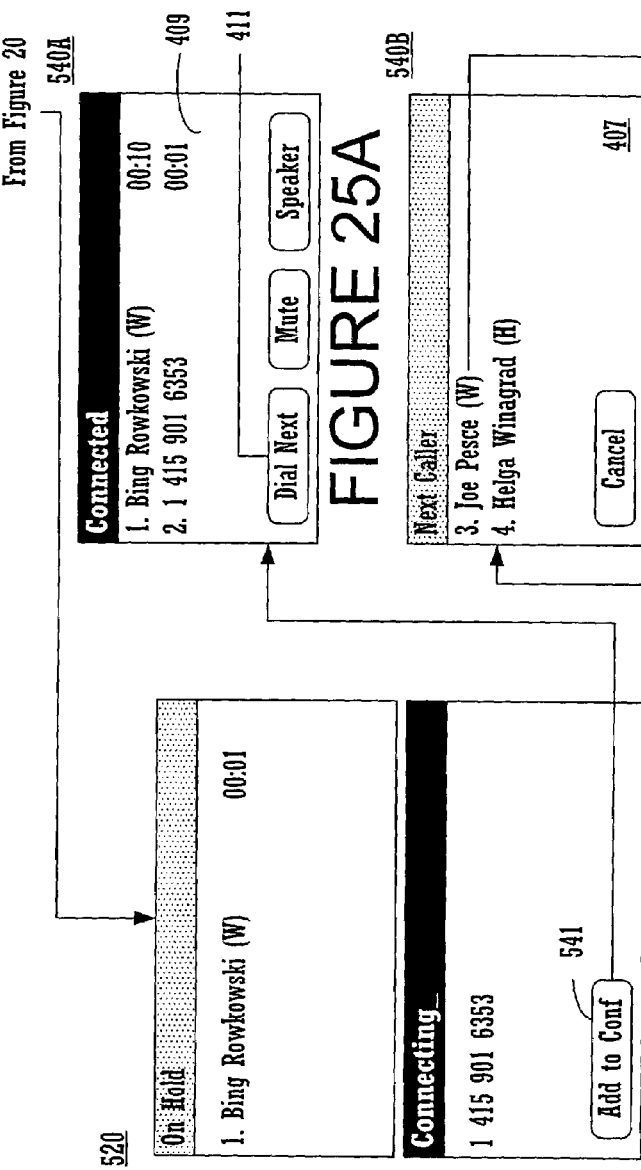
FIG. 24 illustrates the appearance of a call setup menu when an attempted connection made while a call conferee is on hold is successful according to one embodiment of the present invention.
FIG. 25A illustrates the appearance of a call setup menu after the add to button/function has been selected according to one embodiment of the present invention.
FIG. 25B shows the appearance of a menu after an additional conference call conferee has been selected for conferencing according to one embodiment of the present invention.

FIG. 24 shows the appearance of a conference call setup menu 520 when an attempted connection made while a call conferee is on hold is successful according to one embodiment of the present invention. According to one embodiment, when this occurs the status description "connected" may be displayed in the call status display area 401 indicating a successful connection. It should be appreciated that the number of the call conferee that is on hold may be displayed on the viewer screen 417 of menu 520 as is shown in FIG. 24. Moreover, the number of the successfully connected call conferee may be shown on the conferee display 409 of menu 520 as is shown in FIG. 24.

FIG. 25A shows the appearance of a conference call setup menu 540 after the add to conference button/function 541 has been selected according to one embodiment of the present invention. According to one embodiment, when this occurs the status description "connected" may be displayed in the call status display area 401 to indicate the successful connection of a newly added conferee. The numbers of the remaining prospective conferees in the calling que are displayed on the viewer screen 407 of menu 540. In addition, the number of the successfully connected caller is added to the list of successfully connected conferees shown in conferee display 409.

The FIG. 25A menu 540 includes dial next button/function 411, mute button/function 413 and speaker button/function 415 which operate as described previously. It should be appreciated that a selection of the dial next button/function 411 causes the dialing of the next number in line in the sequence of numbers that have been selected to be called. According to one embodiment, once a conferee has been successfully connected the number of the next prospective call conferee in line may be dialed. According to one embodiment, the call time is shown as a line item next to each successfully connected call conferees name that is shown in conferee display 409.

FIG. 25B shows the appearance of a conference setup menu 540B after a particular prospective conference call conferee has been selected from the list of prospective conferees to be called according to one embodiment of the present invention. The FIG. 25B menu 540B is presented after a particular prospective call conferee (e.g., "Joe Pesce") is selected from the list of prospective call conferees to be called that is displayed on the viewer screen shown in FIG. 25A. FIG. 25B shows "send to end of que" 541, "remove from conference" 542 and "cancel" 543 text-key button/functions.

Figure 25C:
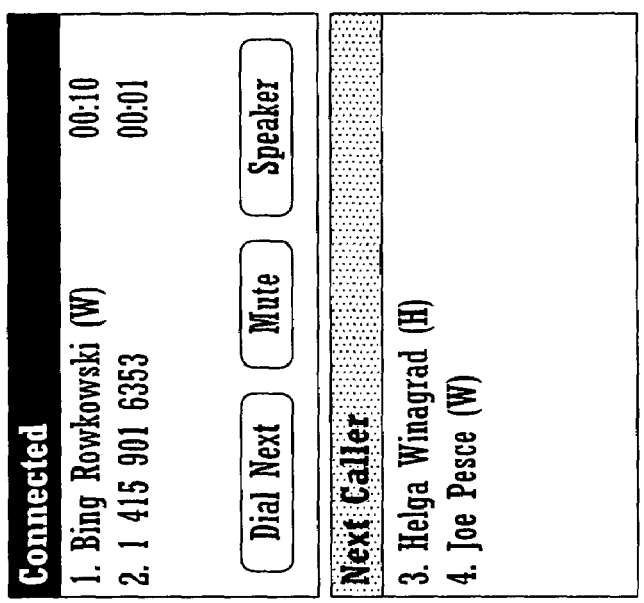
FIG. 25C shows the appearance of a menu after the "remove from conference" text-key button/function has been selected according to one embodiment of the present invention.

FIG. 25C shows the appearance of a conference setup menu 540 after the "send to end of queue" text-key button/function has been selected. As is shown in FIG. 25C, selecting the "send to end of queue" 541 text-key button/function repositions a prospective call conferee in the calling sequence of prospective call conferees from its current position to the end of the sequence (e.g., see FIG. 25C repositioning of conferee "Joe Pesce" in the calling sequence from an initial position to the end of the calling sequence or queue).

Figure 25D:
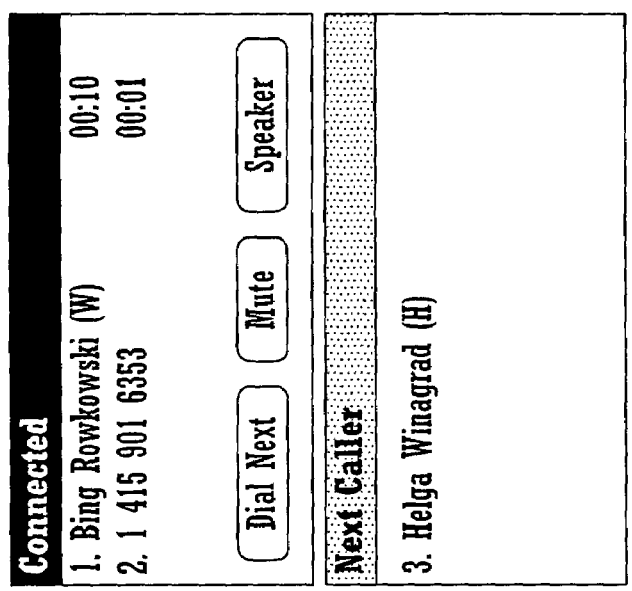
FIG. 25D shows the appearance of a menu after the selection of the "remove from conference" text-key button/function removes a prospective call conferees name from the list of conferees to be connected according to one embodiment of the present invention.

FIG. 25D shows the appearance of menu 540 after the "remove from conference" 542 text-key button/function has been selected. As is shown in FIG. 25D, the selection of the "remove from conference" 542 text-key button/function removes a prospective call conferees name from the list of conferees to be called (e.g., see FIG. 25D removal of prospective conferee "Joe Pesce" from the calling que). It should be appreciated that a selection of the "cancel" 543 text-key button/function results in no change being made to the displayed list of prospective conferees.

Figure 26:
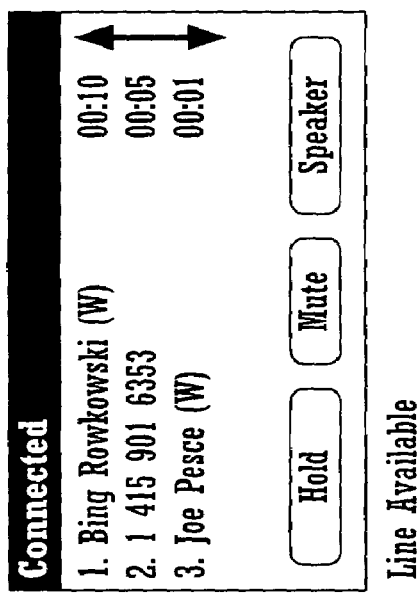
FIG. 26 shows the appearance of a menu 560 after all prospective conferees have been connected according to one embodiment of the present invention.
Figures 27A, 27B:
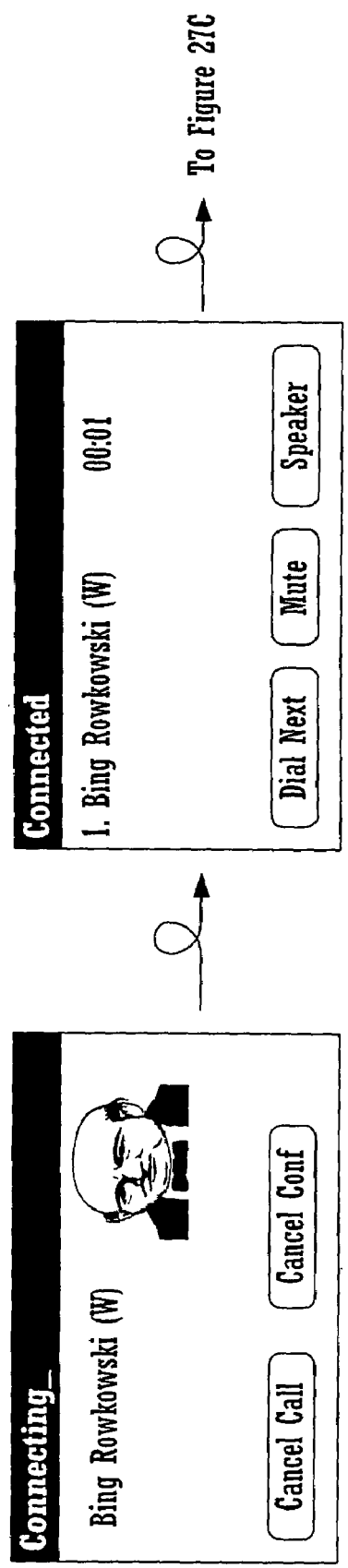
FIG. 27A, FIG. 27B, FIG. 27C, FIG. 27D, and FIG. 27E illustrate a closed viewer screen application of conference call dialing according to one embodiment of the present invention.
Figure 27C:
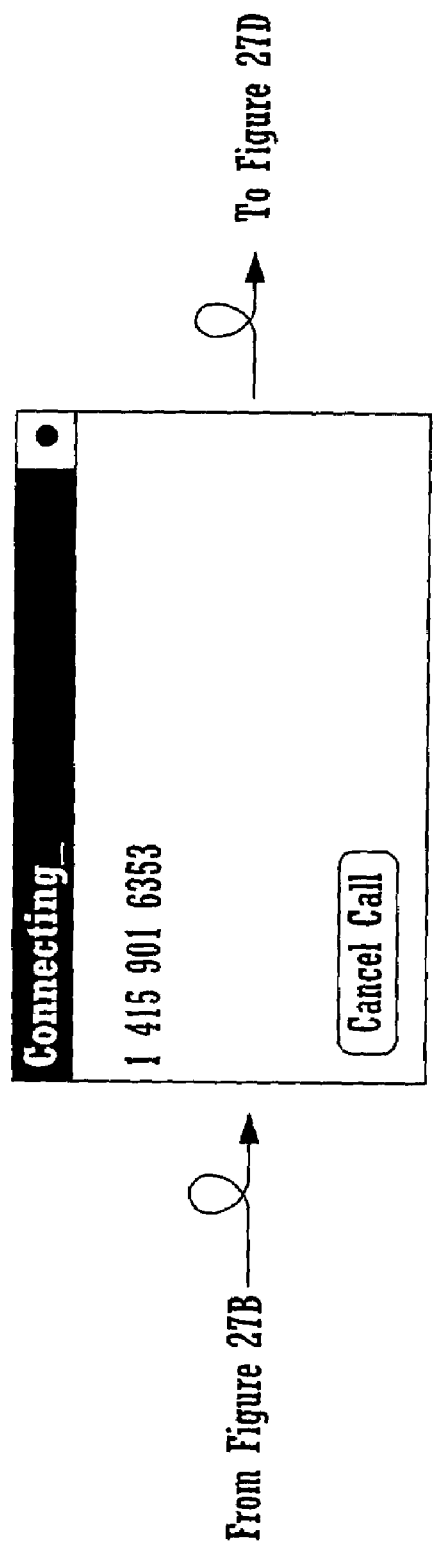
Figures 27D, 27E:
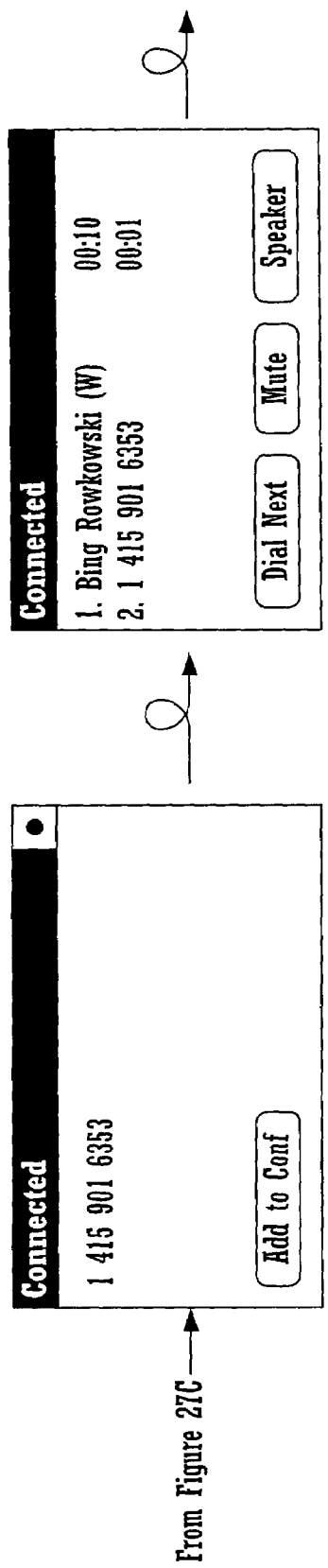

FIG. 26 shows the appearance of a menu 560 after all prospective call conferees have been connected according to one embodiment of the present invention. As is shown in FIG. 26 the successfully connected conferees are listed in the conferee display. If a line is available for connecting additional conferees such may be indicated in menu 560 according to one embodiment. Button/functions "hold" and "mute" provided in menu 560 function as previously described. The "hold" button/function (used to place connected callers on "hold") is employed in many of the conference control operations described below.

Closed View Screen Operation

FIGS. 27A-27E illustrates a closed viewer screen application of automated conference call dialing according to one embodiment of the present invention. In the closed view screen mode, the viewer screen is closed and only the information presented in the prospective conferee display 409 area is displayed. It should be appreciated that, in other respects the options and functions provided in the closed screen mode are the same as are provided in the open viewer screen mode described above. It should be noted that FIG. 27A corresponds to FIG. 16, FIG. 27B corresponds to FIG. 19, FIG. 27C corresponds to FIG. 20, FIG. 27D corresponds to FIG. 24 and FIG. 27E corresponds to FIG. 25A.

Conference Call Control Menus

Figures 28A, 29:
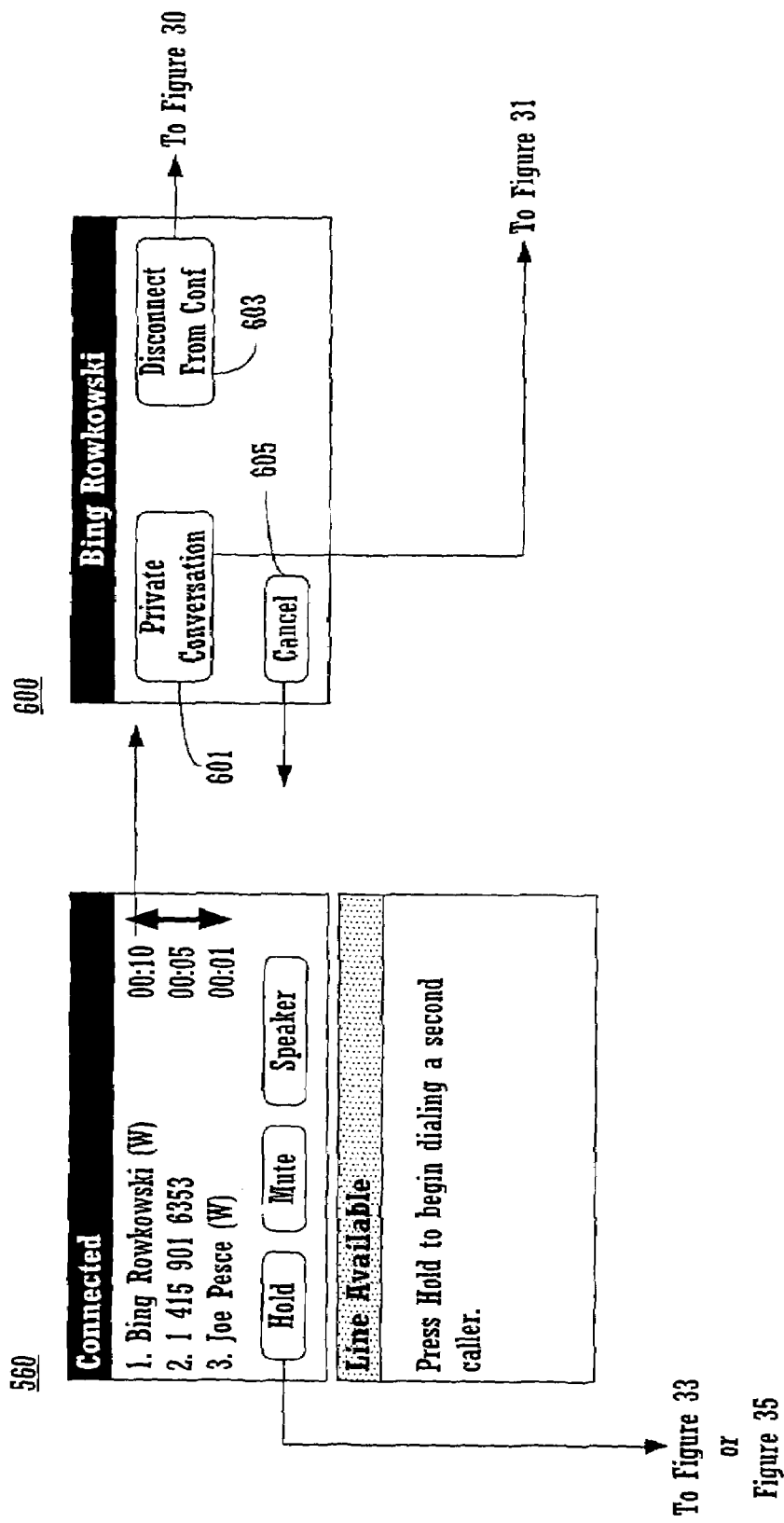
FIG. 28A shows the appearance of a menu after all prospective call conferees have been connected according to one embodiment of the present invention.
FIG. 29 shows the appearance of a menu after a connected conferees name shown in the menu of FIG. 28 is selected from among other connected call conferees according to one embodiment of the present invention.

FIG. 28A shows the appearance of a conference call control menu 560 after all prospective call conferees have been successfully connected according to one embodiment of the present invention. It should be appreciated that once selected (such as by tapping with a stylus etc.) a successfully connected call conferees name may be shown highlighted in menu 560. According to one embodiment, any of the successfully connected conferees may be selected for application of a call control option (described below).

Figure 28B:
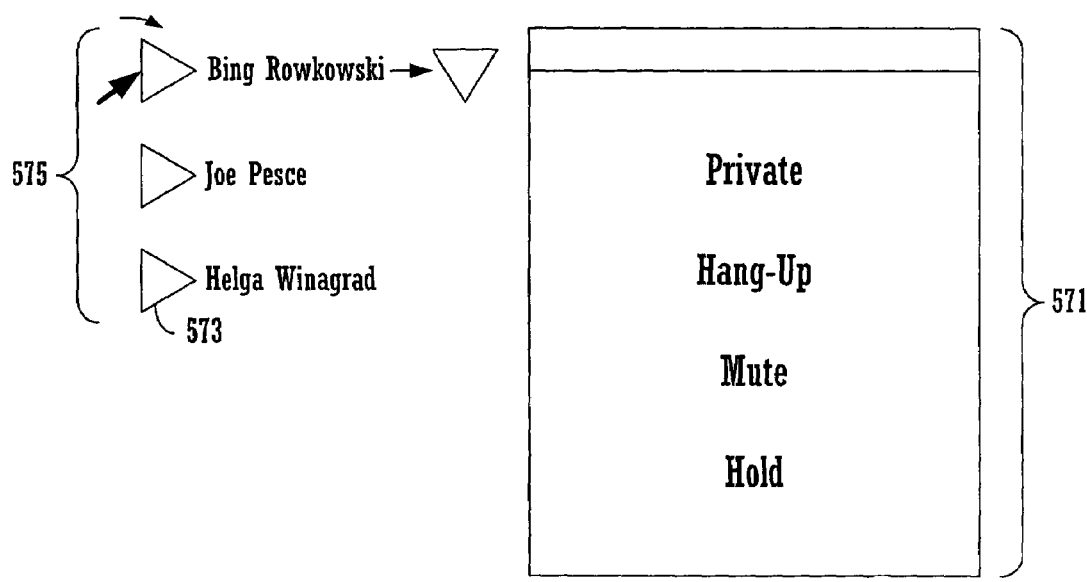
FIG. 28B shows an implementation of a conferee selection interface according to one embodiment of the present invention.

FIG. 28B shows an implementation of a conferee selection interface 570 according to one embodiment of the present invention. According to one embodiment a conferee selection interface may be incorporated as a component part of an exemplary conference call control menu (e.g., 560) as is described herein. FIG. 28B shows a conferee selection interface that includes teleconference control options 571, conferee selection icons 573, and conferee list 575. A user desiring to apply a teleconference control option 571 (e.g., mute, hang-up, hold, private, etc.) to a particular conferee may select the conferee selection icon 573 adjacent the conferees name. Once selected the icon may graphically rotate to reveal the list of conference control options 571 that may then be selected for application to the particular conferee that is associated with the icon. According to one embodiment, the conferee selection icons 573 may have a triangular geometry with a point of the triangle pointing towards the corresponding conferee associated with the conferee selection icon (when the icon is in an initial position). In the illustration shown in FIG. 28B, once selected the point of the icon initially directed towards the corresponding conferee is rotated downward to reveal a list of teleconferencing control options that may be selected. It should be appreciated that in other embodiments other icon geometries and graphical selection schemes may be employed.

FIG. 29 shows the appearance of a conference call control menu 600 after a connected conferees name in menu 560 of FIG. 28 is selected (such as by tapping with a stylus etc.) from among other connected call conferees. After a connected conferees name in menu 560 of FIG. 28 is selected, menu 600 of FIG. 29 is presented displaying the "private conversation" 601, "disconnect from conference" 603, and "cancel" 605 text-key button/functions.

Figure 30:
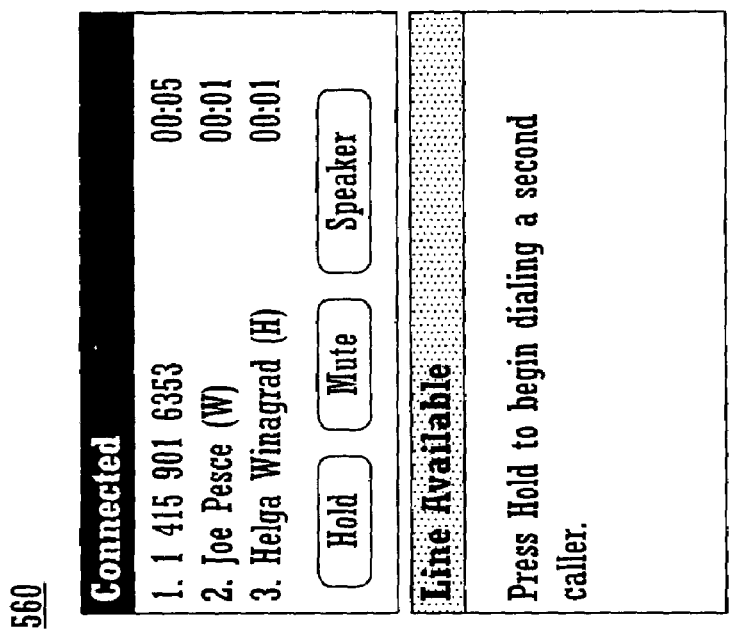
FIG. 30 shows the appearance of menu when the "disconnect from conference" button/function shown in FIG. 29 is selected according to one embodiment of the present invention.

FIG. 30 shows the appearance of menu 560 when the "disconnect from conference" 603 button/function shown in FIG. 29 is selected. As is shown in FIG. 30, when the "disconnect from conference" 603 button/function shown in FIG. 29 is selected, the call conferee whose name is shown in menu 600 of FIG. 29 is disconnected from the call conference and their name removed from the list of connected call conferees. It should be appreciated that each call is logged as a separate call in the systems call logs.

Figures 31, 32:
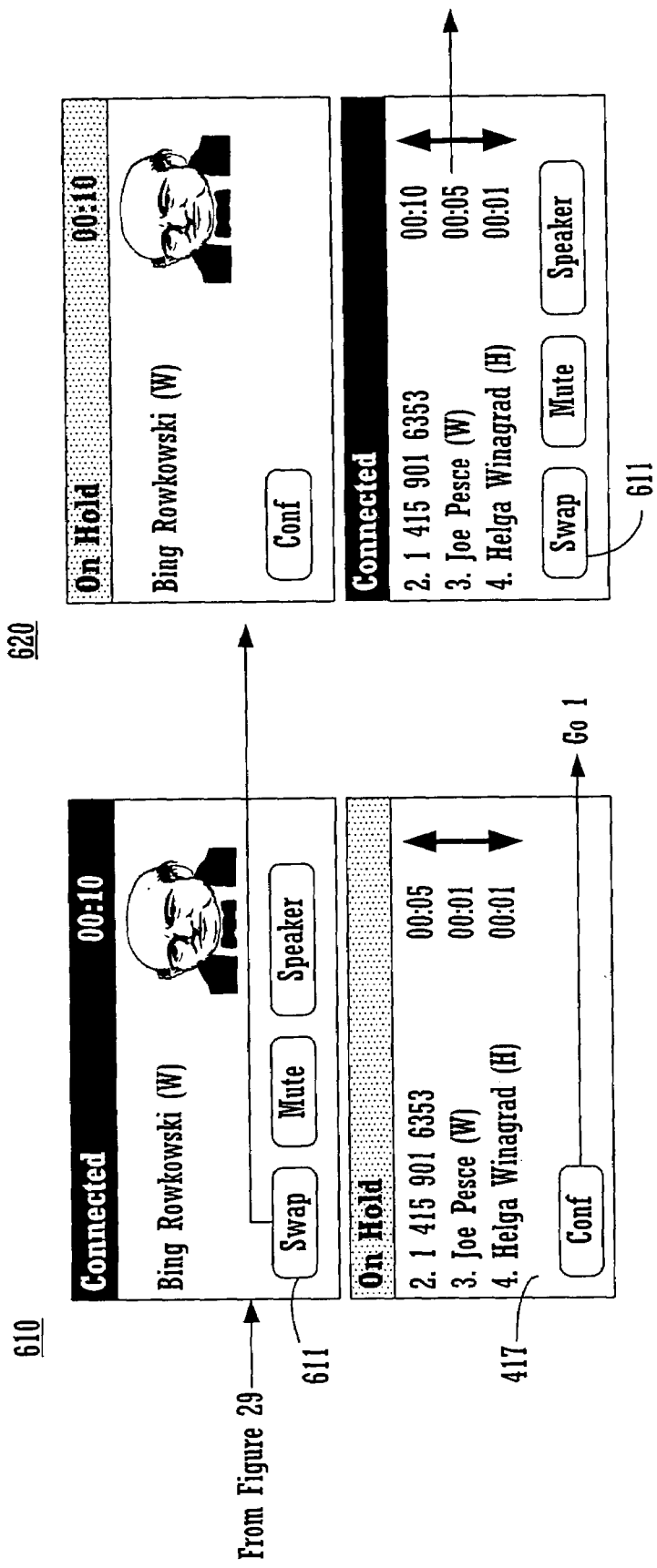
FIG. 31 shows the appearance of a menu when the "private conversation" button/function shown in FIG. 29 is selected according to one embodiment of the present invention.
FIG. 32 shows the appearance of a menu when "on hold" call conferees and a call conferee in a private conversation have their call conferencing statuses reversed according to one embodiment of the present invention.

FIG. 31 shows the appearance of a conference call control menu 610 when the "private conversation" 601 button/function shown in FIG. 29 is selected according to one embodiment of the present invention. As is shown in FIG. 31, when the "private conversation" 601 button/function shown in FIG. 29 is selected, all of the connected call conferees are put on hold, except a call conferee selected for private conversation. According to one embodiment, in this mode the active call timer measures the time of the active call of the call conferee that is selected for private conversation. It should be appreciated that "on hold" conferees (e.g., shown in display area 417) are not selectable.

FIG. 32 shows the appearance of a conference call control menu 620 when "on hold" call conferees and a call conferee in a private conversation have their call conferencing statuses intentionally reversed using a specifically designated text-key button/function according to one embodiment of the present invention. According to one embodiment "on hold" call conferees and a call conferee in a private conversation may have their call conferencing statuses reversed by the selection of the "swap" (shown in FIG. 32) text-key button/function 611. It should be appreciated that when "on hold" call conferees and a call conferee connected in a private conversation have their call conferencing statuses reversed, the individual call conferees that are conference connected as a consequence of the reversal may be selectable (e.g., "tapped" for disconnection or for private conversation).

Figures 33, 34:
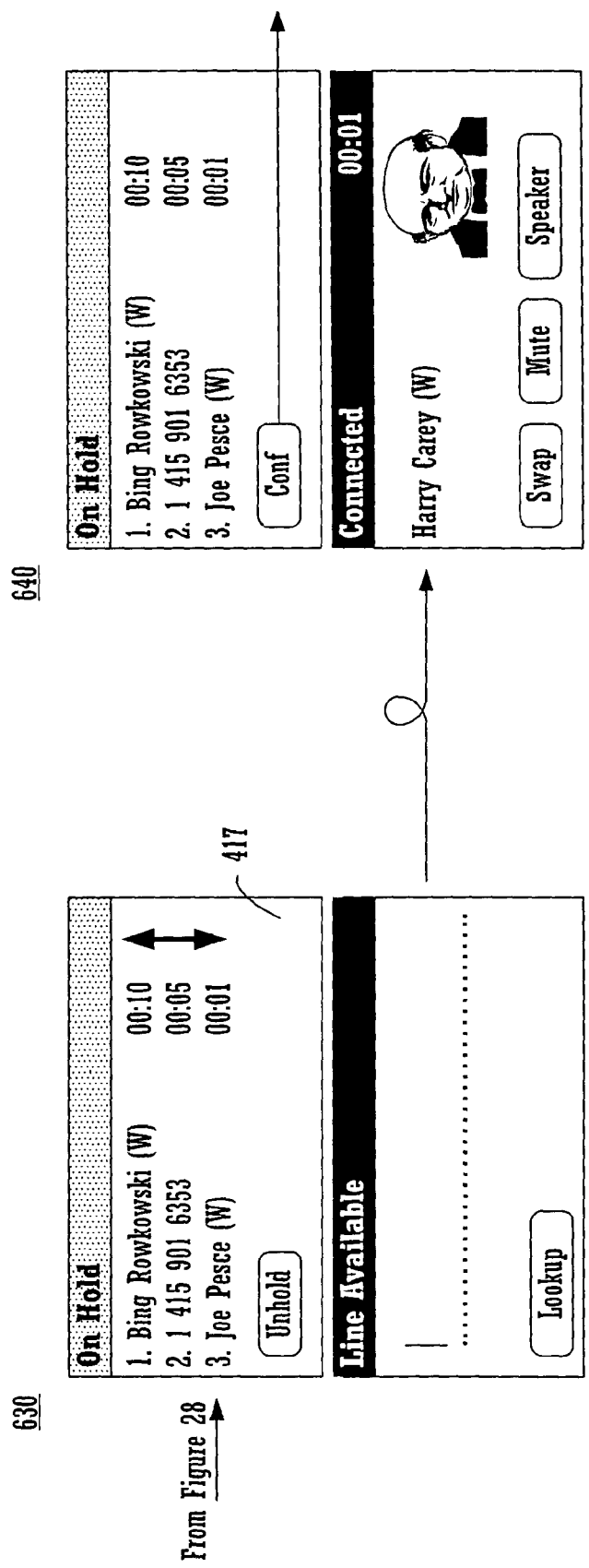
FIG. 33 shows the appearance of a menu when connected call conferees are placed "on hold" where there is a line available for adding an additional call conferee according to one embodiment of the present invention.
FIG. 34 shows the appearance of a menu after a new caller has been successfully connected and there is a line available for adding an additional call conferee according to one embodiment of the present invention.

FIG. 33 shows the appearance of a conference call control menu 630 when connected call conferees are placed "on hold" where there is a line available for adding an additional call conferee according to one embodiment of the present invention. As is shown in FIG. 33, the call conferees that have already been conferenced may be placed "on hold" until the disposition of a new call is resolved. FIG. 34 shows the appearance of a menu 640 after an additional call conferee has been successfully connected and there is a line available to accommodate the successfully connected prospective call conferee according to one embodiment of the present invention. It should be appreciated that in this situation the successfully connected caller may be added to the active conference of call conferees.

Figures 35, 36:
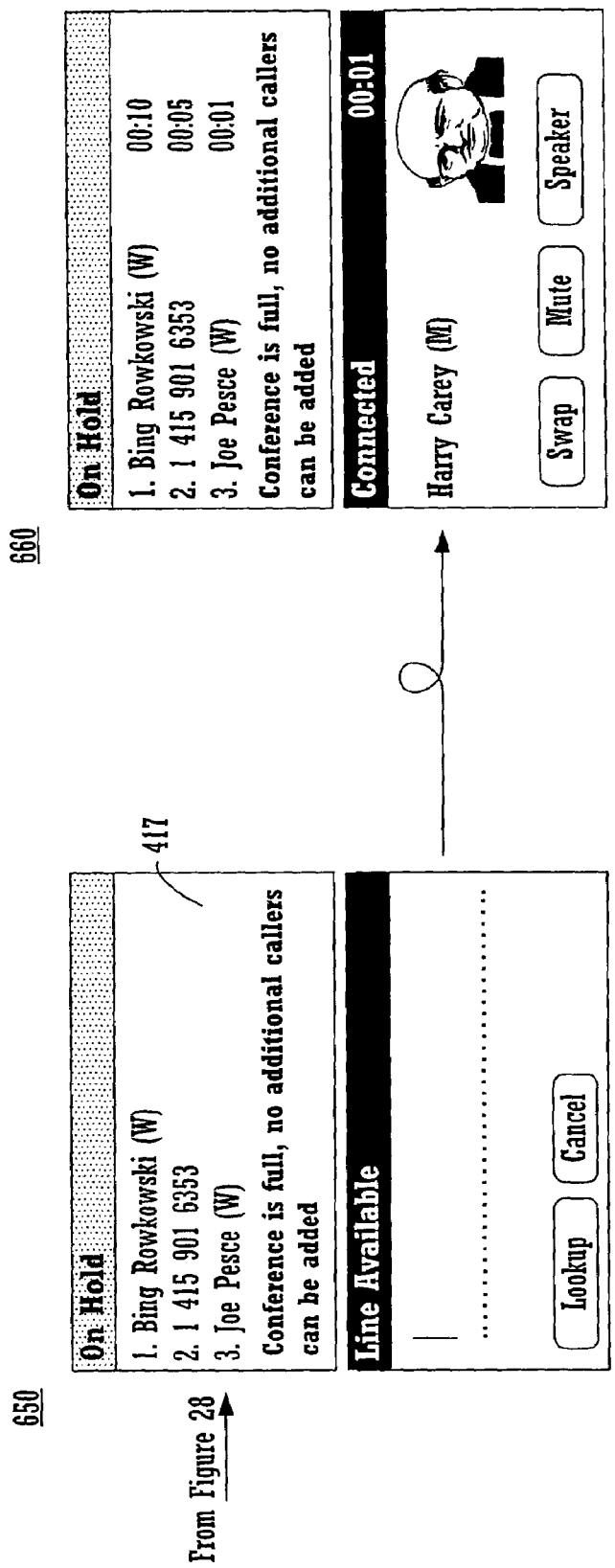
FIG. 35 shows the appearance of a menu when connected call conferees are placed "on hold" where a line is not available for adding an additional call conferee according to one embodiment of the present invention.
FIG. 36 shows the appearance of a menu after an additional call conferee is successfully. connected where a line is not available for adding an additional call conferee according to one embodiment of the present invention.

FIG. 35 shows the appearance of a conference call control menu 650 when connected call conferees are placed "on hold" but a line is not available for adding any additional call conferees according to one embodiment of the present invention. As is shown in FIG. 35, the call conferees that are already conferenced may be placed "on hold" until the disposition of a new call is resolved. FIG. 36 shows the appearance of a menu 660 after an additional call conferee is successfully connected but a line is not available to accommodate the successfully connected prospective call conferee according to one embodiment of the present invention. It should be appreciated that in this situation the successfully connected caller may not be added to the active conference of call conferees.

Figure 37:
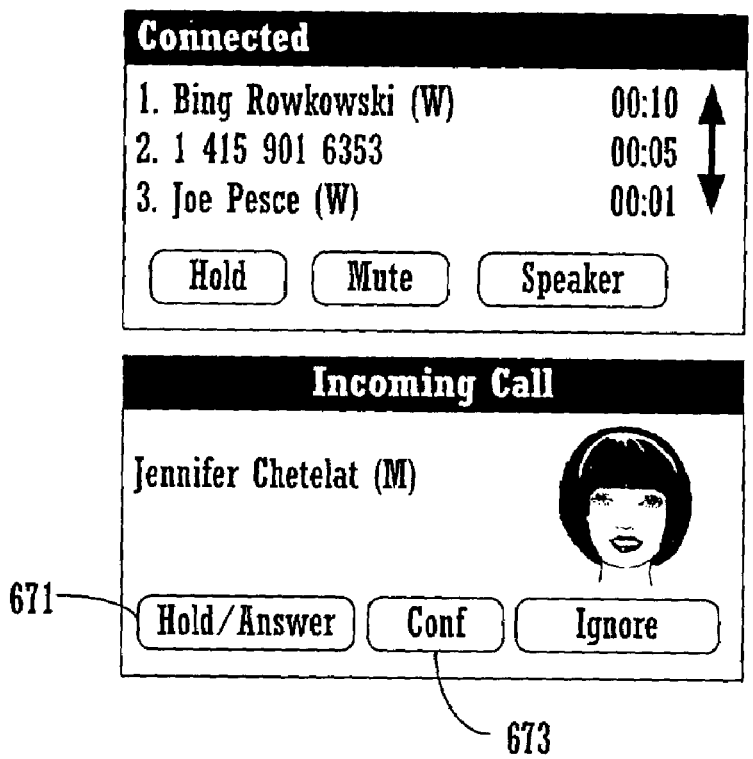
FIG. 37 shows the appearance of a menu when a new incoming call is received during an active conference call according to one embodiment of the present invention.

FIG. 37 shows the appearance of a conference call control menu 670 when a new incoming call is received during an active conference call according to one embodiment of the present invention. As is shown in FIG. 37, when a new incoming call is received while an active conference call is in progress the caller may be added to the active conference call in some circumstances. Referring to FIG. 37, the adding of an incoming caller to the active conference call may be effected by a selection of the "hold/answer" 671 text-key button function which puts the active conference "on hold" and initiates the answering of incoming calls. Thereafter, the selection of the "conferencing" 673 text-key button/function adds the incoming caller to the active conference that is in progress. According to one embodiment, a "send to voicemail" text-key button/function (not shown) may be employed to send the incoming call to a specified voicemail system.

Figure 38:
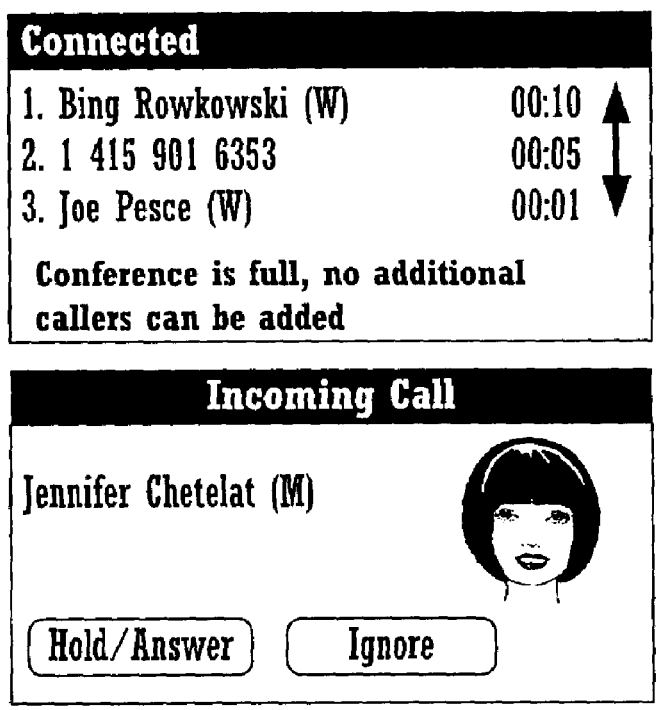
FIG. 38 shows the appearance of a menu when a new incoming call is received during an active conference call but cannot be conferenced according to one embodiment of the present invention.

FIG. 38 shows the appearance of a menu 680 when a new incoming call is received during an active conference call but cannot be conferenced according to one embodiment of the present invention. Referring to FIG. 38, the receiving of the incoming call may be effected by the selection of the "hold/answer" 671 text-key button/function. Thereafter, a subsequent selection of the "hold/answer" 671 text-key button/function puts the active conference "on hold" and initiates the answering of the incoming call. However, because the incoming caller may not be added to the active conference that is already in progress, a "send to voicemail" text-key button/function (not shown) may be employed to redirect the incoming call to a voicemail system.

Figure 39A:
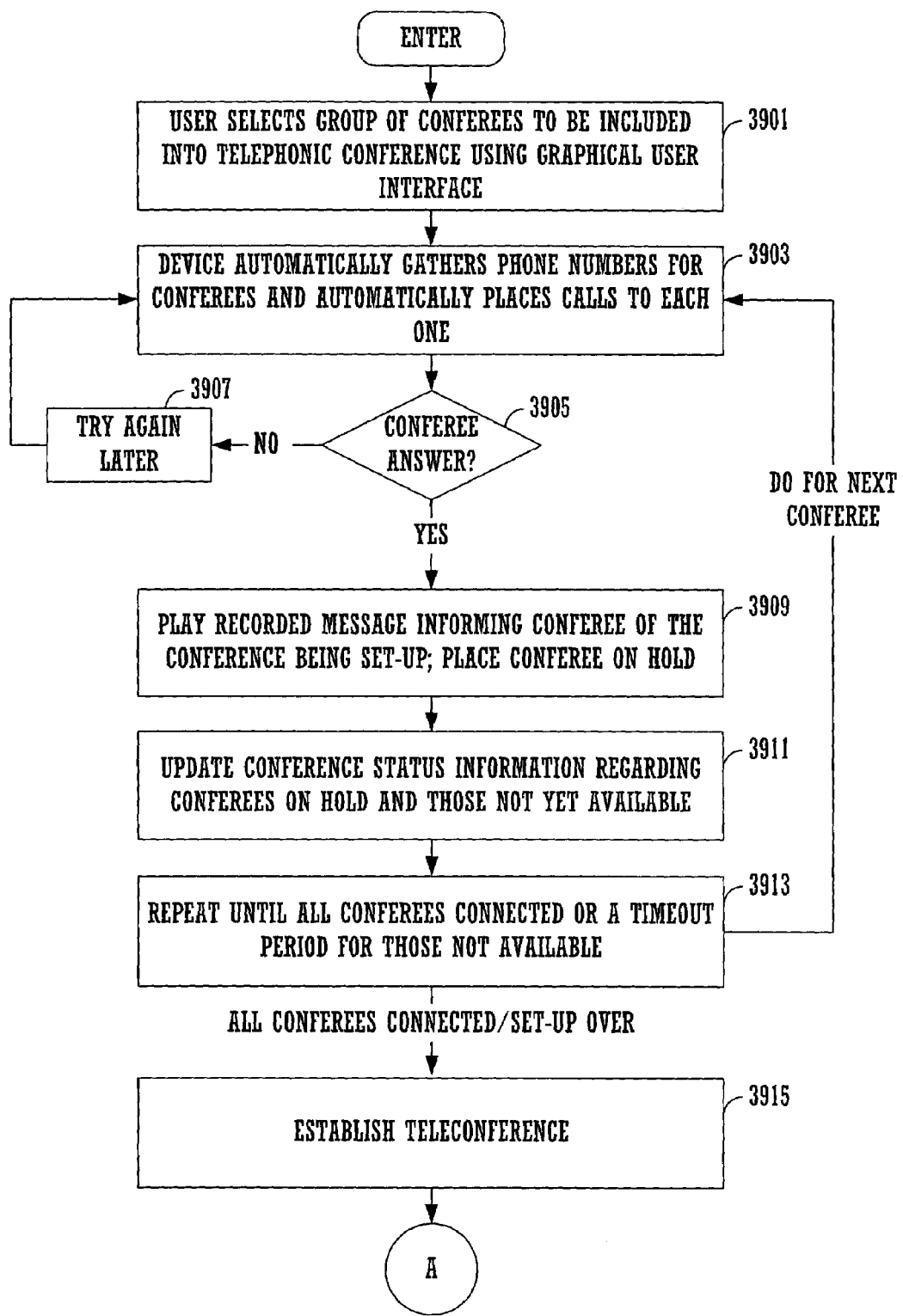
FIG. 39 is a flowchart of the steps performed in a method of telephonically convening conferees according to one embodiment of the present invention.

FIG. 39A shows a flowchart 3900 of the steps performed in processes of the present invention which, in one embodiment, are carried out by processors and electrical components under the control of computer readable and computer executable instructions. The computer readable and computer executable instructions reside, for example, in data storage such as memory units 4004 and 4006 (see FIG. 40). However, the computer readable and computer executable instructions may reside in other types of computer readable medium. Although specific steps are disclosed in the flowcharts, such steps are exemplary. That is, the present invention is well suited to performing various other steps or variations of the steps recited in the flowcharts. Within the present embodiment, it should be appreciated that the steps of the flowcharts may be performed by software, by hardware or by a combination of both.

FIG. 39A is a flowchart 3900 of the steps performed in a method of telephonically convening conferees according to one embodiment of the present invention.

At step 3901, a user selects a group of conferees to be included into a telephonic conference using a graphical user interface. At step 3903, the device automatically gathers phone numbers for conferees and automatically places calls to each one. At step 3905, it is determined if a conferee has answered. If there is no answer the phone number is dialed again at a later time as illustrated at step 3907. If the potential conferee answers then a recorded message is played that informs the potential conferee of the conference that is being set-up and thereafter places the conferee on hold at step 3909. At step 3911, conference status information regarding the conferees on hold and those not yet available is updated. At step 3913, steps 3901 through 3911 are repeated until all conferees are connected. Once all of the conferees have been connected the setup process is ended and the teleconference is established at step 3915.

Figure 39B:
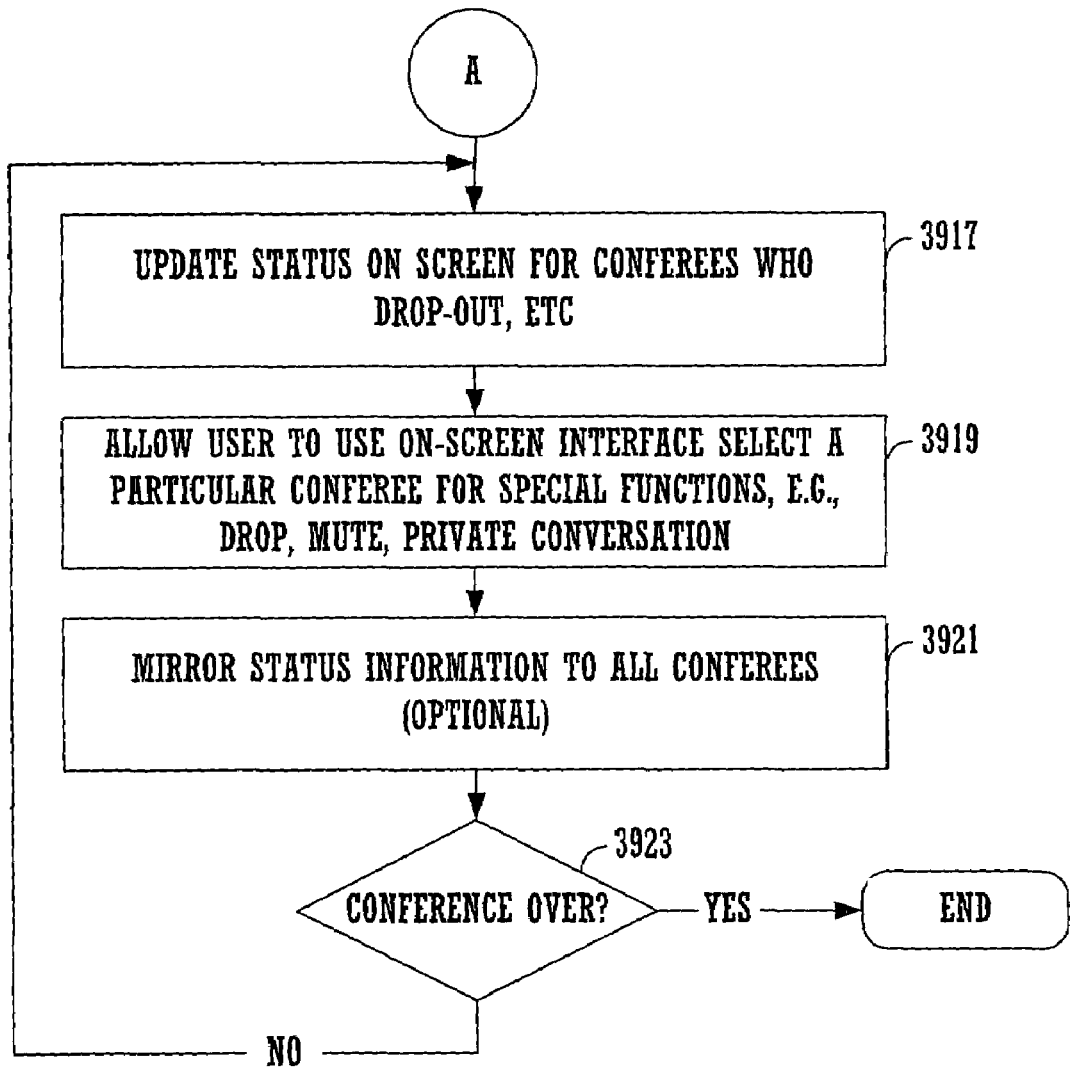

FIG. 39B is a flowchart 3900 of the steps performed in a method of teleconference control according to one embodiment of the present invention.

At step 3917, the status of conferees who have a status change (e.g., are dropped from conference, etc.) is updated. At step 3919, a user is allowed to use an on screen interface to select a particular conferee for the application of a special teleconference control function (e.g., drop, mute, private conversation, etc.). At step 3921, the conferee status information may be mirrored to all connected conferees. And, at step 3923 it is determined if the teleconferencing session has ended or not. If it is determined that the teleconference has not ended, steps 3917 through 3921 may be repeated.

Exemplary Hardware in Accordance with
Embodiments of the Present Invention

Figure 40:
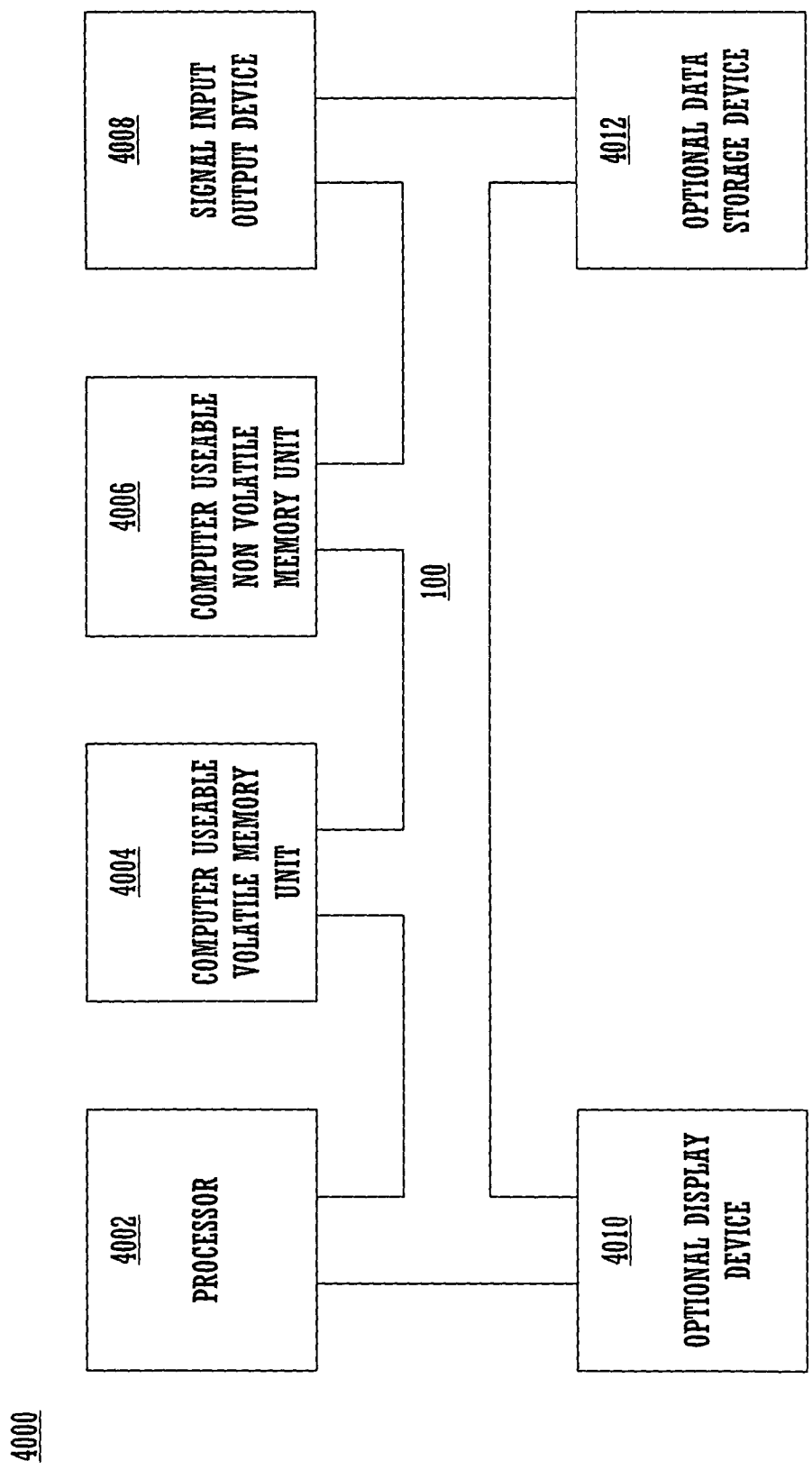
FIG. 40 is a block diagram of an exemplary computer system in accordance with embodiments of the present invention.

FIG. 40 is a block diagram of an exemplary computer system with wireless telephone interface 4000 in accordance with embodiments of the present invention. It should be appreciated that system 4000 is not strictly limited to be a computer system. As such, system 4000 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 4000 and executed by a processor(s) of system 4000. When executed, the instructions cause computer 4000 to perform specific actions and exhibit specific behavior which is described in detail below. According to one embodiment, the instructions may include code that when executed perform the automated telephone conferencing operations discussed herein with reference to FIGS. 39A and 39B.

Computer system 4000 of FIG. 40 comprises an address/data bus 4014 for communicating information, one or more central processors 4002 coupled with bus 4014 for processing information and instructions. Central processor unit 4002 may be a microprocessor or any other type of processor. The computer 4000 also includes data storage features such as a computer usable volatile memory unit 4004 (e.g., random access memory, static RAM, dynamic RAM, etc.) coupled with bus 4014 for storing information and instructions for central processor(s) 4002, a computer usable non-volatile memory unit 4006 (e.g., read only memory, programmable ROM, flash memory, EPROM, EEPROM, etc.) coupled with bus 4014 for storing static information and instructions for processor(s) 4002. System 4000 also includes one or more signal generating and receiving devices 4008 coupled with bus 4014 for enabling system 4000 to interface with other electronic devices. The communication interface(s) 4008 of the present embodiment may include wired and/or wireless communication technology such as a Wireless telephone circuitry. For example, in some embodiments, the communication interface 4008 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 4000 may also include a computer usable mass data storage device 4012 such as a magnetic or optical disk and disk drive (e.g., hard drive or floppy diskette) coupled with bus 4014 for storing information and instructions. An optional display device 4010 may be coupled to bus 4014 of system 4000 for displaying video and/or graphics. It should be appreciated that optional display device 4010 may be a cathode ray tube (CRT), flat panel liquid crystal display (LCD), field emission display (FED), plasma display, or any other display device suitable for displaying video and/or graphic images and alphanumeric characters recognizable to a user.

As noted above with reference to exemplary embodiments thereof, a computer implemented method of conducting a teleconference is disclosed. The method includes selecting a group of potential conferees using a graphical user interface tool displayed on a display screen, automatically setting up the teleconference by accessing telephone numbers for each conferee of the group of potential conferees and individually attempting to make contact with the group of potential conferees over a telephone system. The method further includes updating contact status information for the group of potential conferees during the automatic set up of the teleconference. A teleconference is established between the available conferees of the group of potential conferees.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented method of conducting a teleconference comprising:
   selecting a group of potential conferees using a graphical user interface tool displayed on a display screen;
   automatically setting up said teleconference by accessing telephone numbers for each conferee of said group of potential conferees and individually attempting to make contact with said group of potential conferees over a telephone system;
   updating contact status information for said group of potential conferees during said automatically setting up said teleconference; and
   establishing a teleconference between available conferees of said group of potential conferees.

2. The method as described in claim 1 wherein said telephone system is a wireless telephone system.

3. The method as described in claim 1 wherein said selecting comprising selecting a potential conferee from an on-screen listing of a plurality of names displayed in a column.

4. The method as described in claim 1 further comprising communicating said status information to one of said available conferees.

5. The method as described in claim 4 further comprising displaying said status information on a display screen associated with said one of said available conferees.

6. The method as described in claim 1 further comprising controlling said teleconference in response to on-screen conference control tools.

7. The method as described in claim 6 wherein said controlling comprises muting a selected conferee in response to a mute tool applied to said selected conferee.

8. The method as described in claim 6 wherein said controlling comprises establishing a private conversation with a selected conferee in response to a private conversation tool applied to said selected conferee.

9. The method as described in claim 6 wherein said controlling comprises disconnecting a selected conferee in response to a disconnect tool applied to said selected conferee.

10. The method as described in claim 6 wherein said controlling comprises taking a selected conferee off hold in response to an off-hold tool applied to said selected conferee.

11. The method as described in claim 6 wherein said controlling comprises placing a selected conferee on hold in response to an on-hold tool applied to said selected conferee.

12. The method as described in claim 1 further comprising displaying said contact status information on said display screen.

13. The method as described in claim 6 further comprising updating said status information in response to said controlling said teleconference.

14. The method as described in claim 1 wherein said attempting to make contact with said group of potential conferees over a telephone system comprises:
   automatically placing a telephone call to a first potential conferee;
   playing a recorded message to said first potential conferee upon said telephone call connecting to said first potential conferee; and
   placing said first potential conferee on hold.

15. The method as described in claim 14 wherein said attempting to make contact with said group of potential conferees over a telephone system further comprises:
   automatically placing a telephone call to a second potential conferee;
   playing a recorded message to said second potential conferee upon said telephone call connecting to said second potential conferee; and
   placing said second potential conferee on hold.

16. The method as described in claim 1 wherein said attempting to make contact with said group of potential conferees over a telephone system comprises:
   automatically placing a telephone call to a first potential conferee; and
   automatically redialing said first potential conferee if said telephone call is not answered.

17. The method as described in claim 1 wherein said attempting to make contact with said group of potential conferees over a telephone system comprises:
   automatically placing a telephone call to a first potential conferee; and
   automatically redialing said first potential conferee if said telephone call is busy.

18. The method as described in claim 1 wherein said selecting a group of potential conferees using a graphical user interface tool displayed on a display screen comprises selecting a predetermined conference identifier comprising said group of potential conferees.

19. A device comprising:
   a processor coupled to a bus;
   a display screen coupled to said bus;
   telephone circuitry coupled to said bus; and
   a memory coupled to said bus and comprising instructions that when executed implement a method of conducting a teleconference comprising:
      selecting a group of potential conferees using a graphical user interface tool displayed on said display screen;
      automatically setting up said teleconference by accessing telephone numbers for each conferee of said group of potential conferees and individually attempting to make contact with said group of potential conferees over a telephone system;
      updating contact status information for said group of potential conferees during said automatically setting up said teleconference; and
      establishing a teleconference between available conferees of said group of potential conferees.

20. The device as described in claim 19 wherein said telephone system is a wireless telephone system and wherein said telephone circuitry is wireless telephone circuitry.

21. The device as described in claim 19 wherein said selecting comprising selecting a potential conferee from an on-screen listing of a plurality of names displayed in a column on said display screen.

22. The device as described in claim 19 wherein said method further comprises communicating said status information to one of said available conferees.

23. The device as described in claim 22 wherein said method further comprises displaying said status information on a display screen associated with said one of said available conferees.

24. The device as described in claim 19 wherein said method further comprises controlling said teleconference in response to on-screen conference control tools.

25. The device as described in claim 24 wherein said controlling comprises muting a selected conferee in response to a mute tool applied to said selected conferee.

26. The device as described in claim 24 wherein said controlling comprises establishing a private conversation with a selected conferee in response to a private conversation tool applied to said selected conferee.

27. The device as described in claim 24 wherein said controlling comprises disconnecting a selected conferee in response to a disconnect tool applied to said selected conferee.

28. The device as described in claim 24 wherein said controlling comprises taking a selected conferee off hold in response to an off-hold tool applied to said selected conferee.

29. The device as described in claim 24 wherein said controlling comprises placing a selected conferee on hold in response to an on-hold tool applied to said selected conferee.

30. The device as described in claim 24 wherein said method further comprises updating said status information in response to said controlling said teleconference.

31. The device as described in claim 19 wherein said attempting to make contact with said group of potential conferees over a telephone system comprises:
   automatically placing a telephone call to a first potential conferee;
   playing a recorded message to said first potential conferee upon said telephone call connecting to said first potential conferee; and
   placing said first potential conferee on hold.

32. The device as described in claim 31 wherein said attempting to make contact with said group of potential conferees over a telephone system further comprises:
   automatically placing a telephone call to a second potential conferee;
   playing a recorded message to said second potential conferee upon said telephone call connecting to said second potential conferee; and
   placing said second potential conferee on hold.

33. The device as described in claim 19 wherein said attempting to make contact with said group of potential conferees over a telephone system comprises:
   automatically placing a telephone call to a first potential conferee; and
   automatically redialing said first potential conferee if said telephone call is not answered.

34. The device as described in claim 19 wherein said attempting to make contact with said group of potential conferees over a telephone system comprises:
   automatically placing a telephone call to a first potential conferee; and
   automatically redialing said first potential conferee if said telephone call is busy.

35. The device as described in claim 19 wherein said selecting a group of potential conferees using a graphical user interface tool displayed on a display screen comprises selecting a predetermined conference identifier comprising said group of potential conferees.

36. The device as described in claim 19 wherein said method further comprises displaying said contact status information on said display screen.

37. A computer implemented method of conducting a teleconference comprising:
   accessing a group of potential conferees;
   automatically setting up said teleconference by accessing telephone numbers for each conferee of said group of potential conferees and attempting to make contact with each potential conferees over a telephone system;
   updating contact status information for said group of potential conferees on a display screen during said automatically setting up said teleconference; and
   establishing a teleconference involving available conferees of said group of potential conferees.

38. The method as described in claim 37 wherein said telephone system is a wireless telephone system.

39. The method as described in claim 37 further comprising:
   communicating said status information to one of said available conferees; and
   displaying said status information on a display screen associated with said one of said available conferees.

40. The method as described in claim 37 further comprising controlling said teleconference in response to on-screen conference control tools of said display screen.

41. The method as described in claim 40 wherein said controlling comprises muting a selected conferee in response to a mute tool applied to said selected conferee.

42. The method as described in claim 40 wherein said controlling comprises establishing a private conversation with a selected conferee in response to a private conversation tool applied to said selected conferee.

43. The method as described in claim 40 wherein said controlling comprises disconnecting a selected conferee in response to a disconnect tool applied to said selected conferee.

44. The method as described in claim 37 further comprising displaying said contact status information on said display screen.

45. The method as described in claim 40 further comprising updating said status information in response to said controlling said teleconference.

46. The method as described in claim 37 wherein said attempting to make contact with said group of potential conferees over a telephone system comprises:
   automatically placing a telephone call to a first potential conferee;
   playing a recorded message to said first potential conferee upon said telephone call connecting to said first potential conferee; and
   placing said first potential conferee on hold.

47. The method as described in claim 46 wherein said attempting to make contact with said group of potential conferees over a telephone system further comprises:
   automatically placing a telephone call to a second potential conferee;
   playing a recorded message to said second potential conferee upon said telephone call connecting to said second potential conferee; and
   placing said second potential conferee on hold.

48. The method as described in claim 37 wherein said attempting to make contact with said group of potential conferees over a telephone system comprises:
   automatically placing a telephone call to a first potential conferee; and
   automatically redialing said first potential conferee if said telephone call is not answered.

49. The method as described in claim 37 wherein said attempting to make contact with said group of potential conferees over a telephone system comprises:
   automatically placing a telephone call to a first potential conferee; and
   automatically redialing said first potential conferee if said telephone call is busy.

* * * * *